US012724335B2

(12) United States Patent
Okumura

(10) Patent No.: US 12,724,335 B2
(45) Date of Patent: Sep. 1, 2026

(54) PROJECTION DEVICE, PROJECTION CONTROL METHOD, AND RECORDING MEDIUM

(71) Applicant: NEC Platforms, Ltd., Kawasaki (JP)

(72) Inventor: Fujio Okumura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 312 days.

(21) Appl. No.: 18/681,892

(22) PCT Filed: Feb. 28, 2022

(86) PCT No.: PCT/JP2022/008232
§ 371 (c)(1),
(2) Date: Feb. 7, 2024

(87) PCT Pub. No.: WO2023/026520
PCT Pub. Date: Mar. 2, 2023

(65) Prior Publication Data

US 2024/0353745 A1 Oct. 24, 2024

(30) Foreign Application Priority Data

Aug. 27, 2021 (JP) ................................ 2021-138618

(51) Int. Cl.
*G03B 21/00* (2006.01)
*G03B 21/14* (2006.01)
(Continued)

(52) U.S. Cl.
CPC ......... *G03B 21/147* (2013.01); *G03B 21/005* (2013.01); *G03B 21/206* (2013.01)

(58) Field of Classification Search
CPC .. G03B 21/005; G03B 21/006; G03B 21/008; G02B 2027/012; G02B 27/0101; H04N 9/3108
See application file for complete search history.

(56) References Cited

U.S. PATENT DOCUMENTS

2016/0062222 A1* 3/2016 Ogura .................. H04N 9/3111
353/84

FOREIGN PATENT DOCUMENTS

JP 2013-235256 A 11/2013
JP 2015-087596 A 5/2015
(Continued)

OTHER PUBLICATIONS

Maehata et al., JP 2015/087596A Machine Translation into English; Jan. 24, 2026 (Year: 2015).*
(Continued)

*Primary Examiner* — Ryan D Howard
(74) *Attorney, Agent, or Firm* — Sughrue Mion, PLLC

(57) ABSTRACT

A projection device includes a light source, spatial light modulator, a control unit, and a shield. The spatial light modulator has a modulation part that modulates the phase of light emitted from the light source. The control unit divides the modulation part of the spatial light modulator into at least two regions and sets phase images of the target image in these regions. The light source is controlled to emit light onto the modulation parts with the phase images. The shield allows light from the image region for the desired image to pass through as projection light while blocking light from an unnecessary region, including ghost images.

9 Claims, 24 Drawing Sheets

(51) Int. Cl.
*G03B 21/20* (2006.01)
*H04N 9/31* (2006.01)

(56) References Cited

FOREIGN PATENT DOCUMENTS

| | | | |
|---|---|---|---|
| KR | 2019-0127333 | A | 11/2019 |
| WO | 2018/056198 | A1 | 3/2018 |
| WO | 2018/101097 | A1 | 6/2018 |
| WO | 2019/116526 | A1 | 6/2019 |
| WO | 2022/201941 | A1 | 9/2022 |

OTHER PUBLICATIONS

JP Office Action for JP Application No. 2021-138618, mailed on Jan. 23, 2024 with English Translation.
International Search Report for PCT Application No. PCT/JP2022/008232, mailed on Apr. 19, 2022.
English translation of Written opinion for PCT Application No. PCT/JP2022/008232, mailed on Apr. 19, 2022.

* cited by examiner (A)
IMAGE REGION
UNNECESSARY REGION
1410
1412
1511
141
(B)
UNNECESSARY REGION
IMAGE REGION
1420
142
1521
1422
(C)
155
1521
1511

4330
4310
4320

436
435
43
442
432
430
431
403-2
403-1
441
45-2
45-1
452
451
460
46
465
475

PROJECTION DEVICE, PROJECTION CONTROL METHOD, AND RECORDING MEDIUM

This application is a National Stage Entry of PCT/JP2022/008232 filed on Feb. 28, 2022, which claims priority from JP Patent Application 2021-138618 filed on Aug. 27, 2021, the contents of all of which are incorporated herein by reference, in their entirety.

TECHNICAL FIELD

The present disclosure relates to a projection device or the like that projects spatial light.

BACKGROUND ART

In optical spatial communication, an optical signal (hereinafter, also referred to as a spatial optical signal) propagating in space is transmitted and received without using a medium such as an optical fiber. For example, by using a projection device including a phase modulating spatial light modulator, a spatial optical signal can be transmitted without focusing. Projection light projected by a projection device including a phase modulating spatial light modulator includes a light component that forms a ghost image. Therefore, it is required to remove a light component forming a ghost image included in projection light by using some method.

PTL 1 discloses a projection device including a phase modulation type spatial light modulation element. The device of PTL 1 includes a light source, a light source drive unit, a spatial light modulation element, a modulation element control unit, a projection control unit, and a projection optical system. The projection control unit controls the light source drive unit and the modulation element control unit in such a way as to display the phase distribution of the image including the ghost compensation image and the desired image on the display unit of the spatial light modulation part. The ghost compensation image is an image in which a portion of display information displayed on a face to be projected is bright, a portion of a ghost image generated accompanying the display information is dark, and luminance is set to be high as a whole.

CITATION LIST

Patent Literature

PTL1: WO 2018/101097 A1

SUMMARY OF INVENTION

Technical Problem

According to the device of PTL 1, by displaying the phase distribution of the image including the ghost compensation image and the desired image on the display unit of the spatial light modulation part, the ghost image is hardly visually recognized on the face to be projected. However, in the method of PTL 1, although the ghost image can be made difficult to be visually recognized, the ghost image cannot be completely removed. In the method of PTL 1, since projection light is projected using a projection optical system such as a Fourier transform lens or a projection lens, there is a possibility that deterioration of an image due to the projection optical system occurs.

An object of the present disclosure is to provide a projection device or the like capable of projecting projection light for displaying an image including no ghost image without using a projection optical system.

Solution to Problem

A projection device according to an aspect of the present disclosure includes a light source, a spatial light modulator that includes a modulation part that is irradiated with light emitted from the light source and that modulates a phase of the light with which the modulation part is irradiated, a control unit that allocates at least two modulation regions to the modulation part of the spatial light modulator, sets phase images of at least two images constituting a target image on a face to be projected in the at least two respective modulation regions, and controls the light source in such a way that the modulation part in which the phase images of the at least two images are set is irradiated with the light, and a shield that is disposed on an optical path of modulated light modulated by the modulation part of the spatial light modulator and that is configured to transmit a light component in an image region where a desired image is formed as projection light and shield a light component in an unnecessary region including a ghost image of the desired image of the modulated light modulated in each of the at least two modulation regions set in the modulation part of the spatial light modulator.

In a projection control method according to an aspect of the present disclosure of controlling a projection device including a light source, a spatial light modulator that includes a modulation part that is irradiated with light emitted from the light source and that modulates a phase of the light with which the modulation part is irradiated, and a shield that is disposed on an optical path of modulated light modulated by the modulation part of the spatial light modulator and that is configured to transmit a light component in an image region where a desired image is formed as projection light and shield a light component in an unnecessary region including a ghost image of the desired image of the modulated light modulated by the modulation part of the spatial light modulator, the method includes allocating at least two modulation regions to the modulation part of the spatial light modulator, setting phase images of at least two images constituting a target image on a face to be projected in the at least two respective modulation regions, and controlling the light source in such a way that the modulation part in which the phase images of the at least two images are set is irradiated with the light.

In a program according to an aspect of the present disclosure for controlling a projection device including a light source, a spatial light modulator that includes a modulation part that is irradiated with light emitted from the light source and that modulates a phase of the light with which the modulation part is irradiated, and a shield that is disposed on an optical path of modulated light modulated by the modulation part of the spatial light modulator and that is configured to transmit a light component in an image region where a desired image is formed as projection light and shield a light component in an unnecessary region including a ghost image of the desired image of the modulated light modulated by the modulation part of the spatial light modulator, the program causes a computer to execute the steps of allocating at least two modulation regions to the modulation part of the spatial light modulator, setting phase images of at least two images constituting a target image on a face to be projected in the at least two respective modulation regions, and controlling the light source in such a way that the modulation part in which the phase images of the at least two images are set is irradiated with the light.

Advantageous Effects of Invention

According to the present disclosure, it is possible to provide a projection device or the like capable of projecting projection light for displaying an image including no ghost image without using a projection optical system.

EXAMPLE EMBODIMENT

Figure 1:
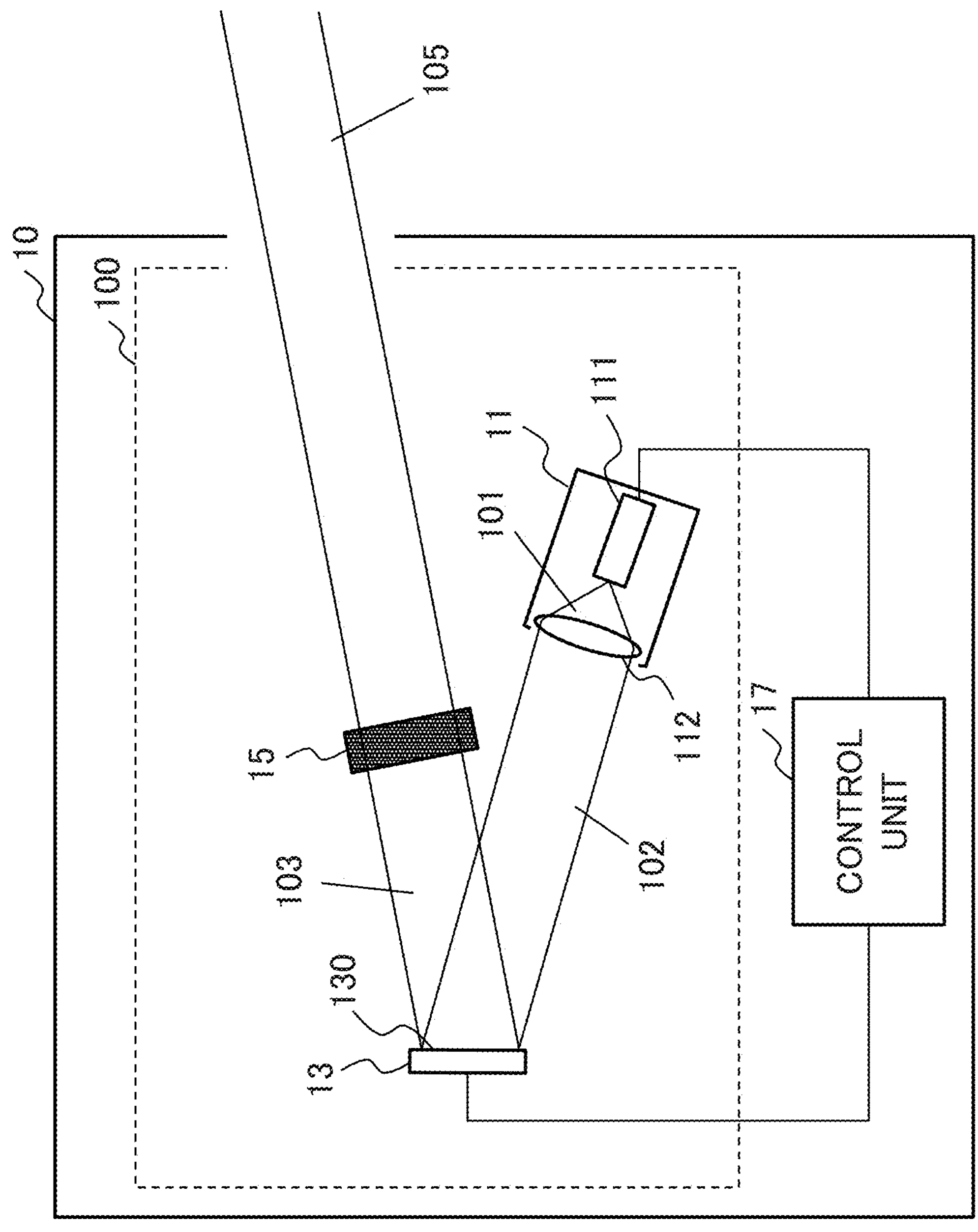
FIG. 1 is a conceptual diagram illustrating an example of a configuration of a projection device according to a first example embodiment.

Hereinafter, embodiments of the present invention will be described with reference to the drawings. However, the example embodiments described below have technically preferable limitations for carrying out the present invention, but the scope of the present invention is not limited to the following. In all the drawings used in the following description of the example embodiment, the same reference numerals are given to the same parts unless there is a particular reason. In the following example embodiments, repeated description of similar configurations and operations may be omitted.

In all the drawings used for description of the following example embodiments, the directions of the arrows in the drawings are merely examples, and do not limit the directions of light and signals. A line indicating a trace of light in the drawings is conceptual, and does not accurately indicate an actual traveling direction or state of light. For example, in the drawings, a change in a traveling direction or a state of light due to refraction, reflection, diffraction, diffusion, or the like at an interface between air and a substance may be omitted, or a pencil of light may be expressed by one line.

First Example Embodiment

First, a projection device according to a first example embodiment will be described with reference to the drawings. For example, the projection device of the present example embodiment is used for optical spatial communication in which an optical signal (hereinafter, also referred to as a spatial optical signal) propagating in a space is transmitted and received without using a medium such as an optical fiber. The projection device of the present example embodiment may be used for applications other than optical spatial communication as long as the projection device is used for projecting light propagating in a space.

(Configuration)

FIG. 1 is a conceptual diagram illustrating an example of a configuration of a projection device 10 of the present example embodiment. The projection device 10 includes a light source 11, a spatial light modulator 13, a shield 15, and a control unit 17. The light source 11, the spatial light modulator 13, and the shield 15 constitute a projection unit 100. FIG. 1 is a side view of an internal configuration of a projection device 10 when viewed from a lateral direction. FIG. 1 is conceptual, and does not accurately represent the positional relationship between the components, the traveling direction of light, and the like.

The light source 11 includes an emitter 111 and a lens 112. The emitter 111 emits laser light 101 in a predetermined wavelength band under the control of the control unit 17. The wavelength of the laser light 101 emitted from the light source 11 is not particularly limited, and may be selected according to the application. For example, the emitter 111 emits the laser light 101 in the visible or infrared wavelength band. For example, in the case of near infrared rays of 800 to 900 nanometers (nm), the laser class can be increased, so that the sensitivity can be improved by about one digit as compared with other wavelength bands. For example, a high-output laser light source can be used for infrared rays in a wavelength band of 1.55 micrometers (μm). As an infrared laser light source in a wavelength band of 1.55 μm, an aluminum gallium arsenide phosphorus (AlGaAsP)-based laser light source, an indium gallium arsenide (InGaAs)-based laser light source, or the like can be used. The longer the wavelength of the laser light 101 is, the larger the diffraction angle can be made and the higher the energy can be set.

The lens 112 enlarges the laser light 101 emitted from the emitter 111 in accordance with the size of a modulation part 130 of the spatial light modulator 13. The laser light 101 emitted from the emitter 111 is enlarged by the lens 112 and emitted from the light source 11. Light 102 emitted from the light source 11 travels toward the modulation part 130 of the spatial light modulator 13.

The spatial light modulator 13 includes modulation part 130 irradiated with the light 102. The modulation part 130 of the spatial light modulator 13 is irradiated with the light 102 emitted from the light source 11. In the modulation part 130 of the spatial light modulator 13, a pattern related to the image displayed by projection light 105 is set according to the control of the control unit 17. The light 102 incident on the modulation part 130 of the spatial light modulator 13 is modulated according to the pattern set in the modulation part 130 of the spatial light modulator 13. Modulated light 103 modulated by the modulation part 130 of the spatial light modulator 13 travels toward the shield 15.

For example, the spatial light modulator 13 is achieved by a spatial light modulator using ferroelectric liquid crystal, homogeneous liquid crystal, vertical alignment liquid crystal, or the like. For example, the spatial light modulator 13 can be achieved by liquid crystal on silicon (LCOS). The spatial light modulator 13 may be achieved by a micro electro mechanical system (MEMS). In the phase modulating spatial light modulator 13, the energy can be concentrated on the portion of the image by operating to sequentially switch the portion on which the projection light 105 is projected. Therefore, in the case of using the phase modulating spatial light modulator 13, when the output of the light source 11 is the same, the image can be displayed brighter than that of other methods.

Figure 2:
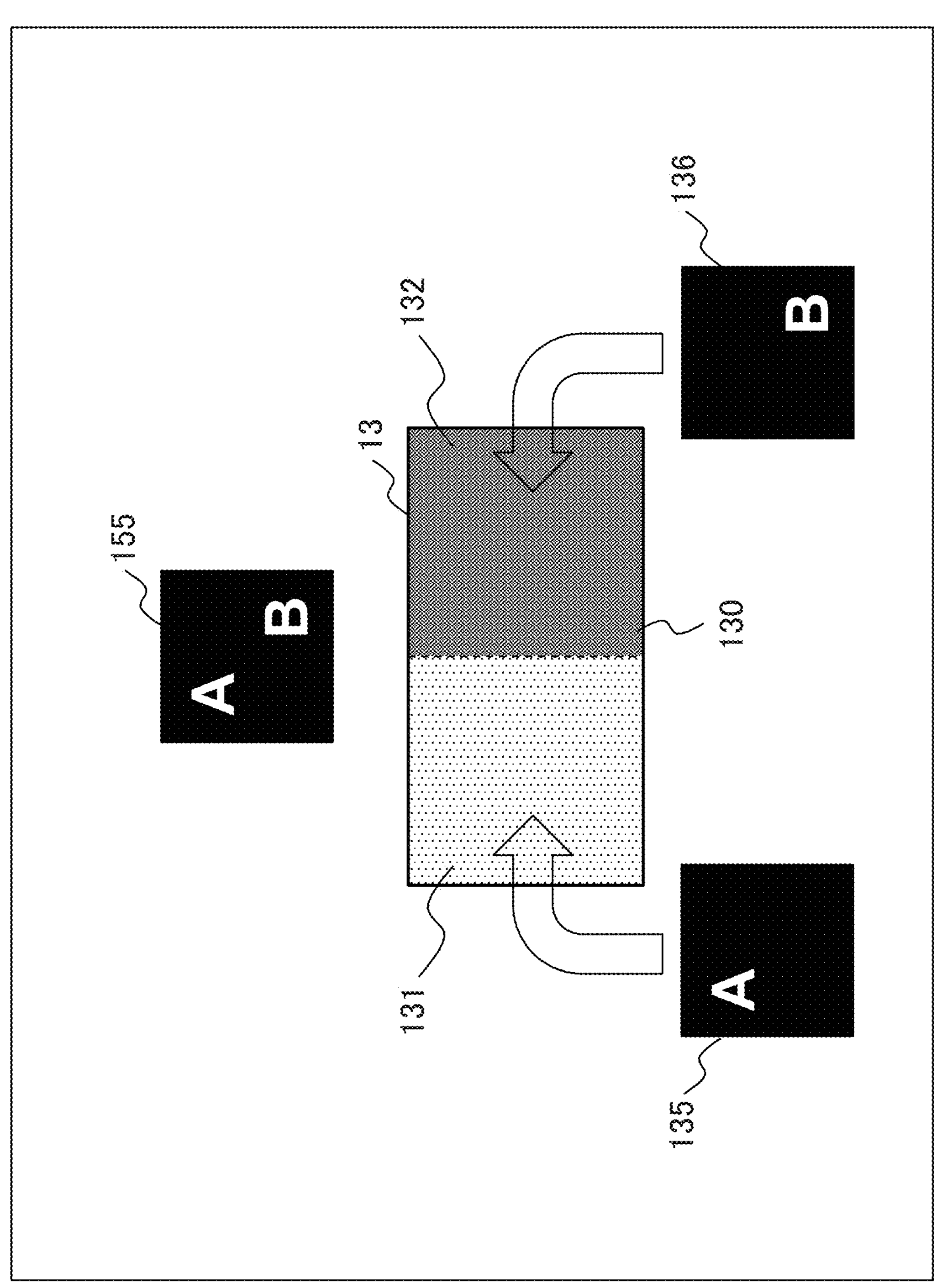
FIG. 2 is a conceptual diagram for describing region division of a modulation part of the spatial light modulator of the projection device according to the first example embodiment.

FIG. 2 is a conceptual diagram for describing region division of the modulation part 130 of the spatial light modulator 13. A first modulation region 131 and a second modulation region 132 are set in the modulation part 130 of the spatial light modulator 13. A phase image related to an image (also referred to as a first image 135) in the left range of a target image 155 is set in first modulation region 131. The first image 135 includes at least one image (also referred to as a desired image). Although FIG. 2 illustrates the first image 135, a phase image for forming the first image 135 is actually set in the first modulation region 131. A phase image related to an image (also referred to as a second image 136) in the right range of the target image 155 is set in second modulation region 132. The second image 136 includes at least one image (also referred to as a desired image). Although FIG. 2 illustrates the second image 136, a phase image for forming second image 136 is actually set in the second modulation region 132. The first image 135, the second image 136, and the target image 155 are examples, and do not limit the image displayed by the projection light projected from the projection device 10. For example, when only one of first image 135 and second image 136 includes the desired image to be displayed, only the phase image of the image including the desired image to be displayed may be set in modulation part 130.

Each of the first modulation region 131 and the second modulation region 132 allocated to the modulation part 130 of the spatial light modulator 13 is divided into a plurality of regions (also referred to as tiling). For example, each of the first modulation region 131 and the second modulation region 132 is divided into rectangular regions (also referred to as tiles) having a desired aspect ratio. Each of the plurality of tiles includes a plurality of pixels. A phase image is allocated to each of the plurality of tiles set in the first modulation region 131 and the second modulation region 132.

A phase image is tiled to each of the plurality of tiles allocated to the modulation part 130. For example, a phase image generated in advance is set in each of the plurality of tiles. A phase image related to an image to be projected is set to each of the plurality of tiles. A phase image for forming the first image 135 is set in the tile of the first modulation region 131. A phase image for forming the second image 136 is set in the tile of the second modulation region 132. When the modulation part 130 is irradiated with the light 102 in a state where the phase images are set for the plurality of tiles, the modulated light 103 that forms an image related to the phase image of each tile is emitted. As the number of tiles set in the modulation part 130 increases, a clear image can be displayed. When the number of pixels of each tile decreases, the resolution decreases. Therefore, the size and number of tiles set in the modulation part 130 are set according to the application.

Figure 3:
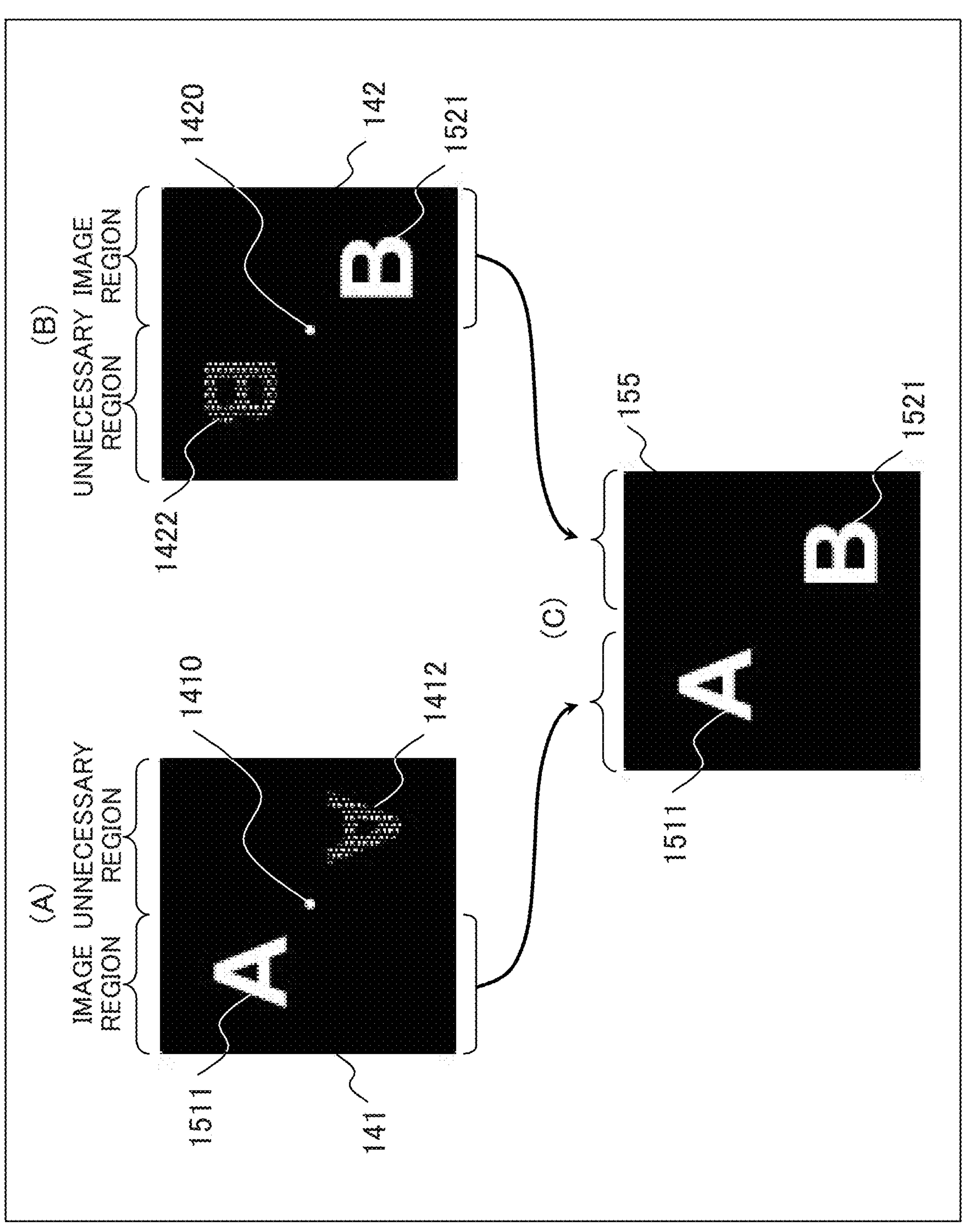
FIG. 3 is a conceptual diagram for describing unnecessary light components included in modulated light modulated by a modulation part of a spatial light modulator of the projection device according to the first example embodiment.

FIG. 3 is a conceptual diagram for describing unnecessary light components included in the modulated light 103 modulated by the modulation part 130 of the spatial light modulator 13. When the modulated light 103 modulated by the modulation part 130 of the spatial light modulator 13 is projected without using the shield 15, a high-order component (ghost image) or 0th-order light of the desired image included in the target image 155 is displayed together with the desired image. For example, an image 141 displayed by modulated light 103-1 modulated in the first modulation region 131 includes 0th-order light 1410 and a ghost image 1412 in addition to a desired image 1511 (A). For example, an image 142 displayed by modulated light 103-2 modulated in the second modulation region 132 includes 0th-order light 1420 and the ghost image 1422 in addition to a desired image 1521 (B). In the present example embodiment, an unnecessary region including the 0th-order light and the ghost image is shielded by the shield 15, and the projection light 105 forming an image of an image region is projected. The projection light 105 displays the target image 155 including the desired image 1511 (A) and the desired image 1521 (B) on the face to be projected. As illustrated in FIG. 3, the ghost image is displayed at a point symmetrical position with respect to the desired image around the 0th-order light. Therefore, in order to remove the ghost image including the 0th-order light, it is preferable to set the unnecessary region slightly wider than the image region.

Figure 4:
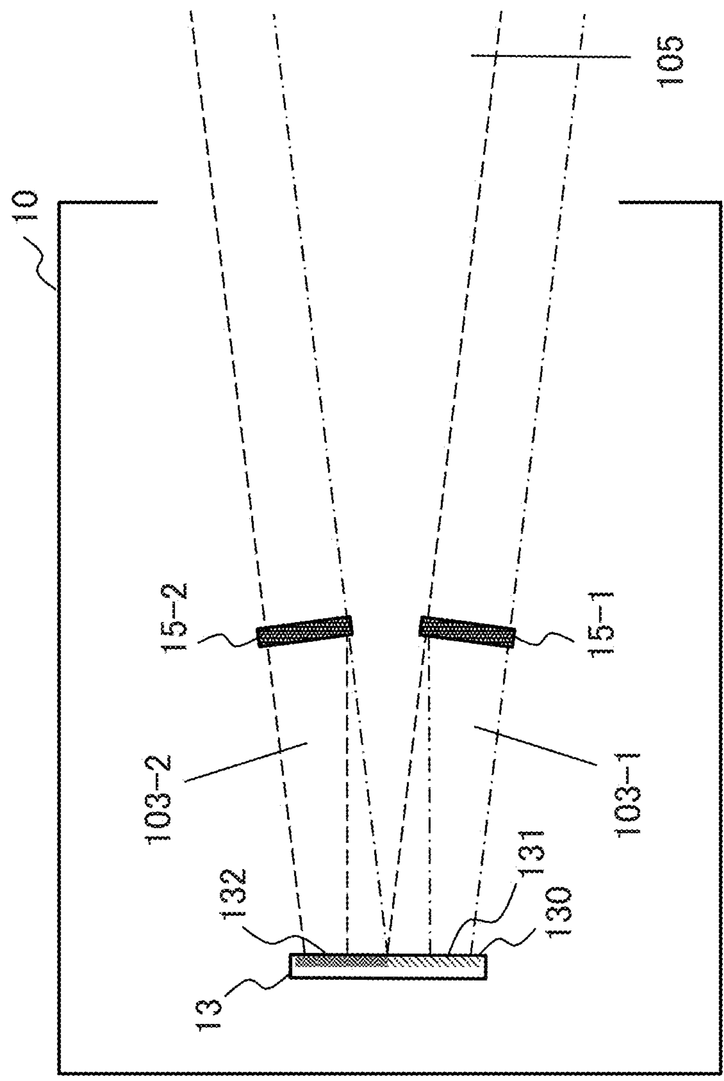
FIG. 4 is a conceptual diagram illustrating a state in which modulated light modulated by the modulation part of the spatial light modulator of the projection device according to the first example embodiment is projected as projection light.

FIG. 4 is a conceptual diagram illustrating a state in which the modulated light 103 modulated by the modulation part 130 of the spatial light modulator 13 is projected as the projection light 105. FIG. 4 is a plan view of the internal configuration of the projection device 10 when viewed from above. In FIG. 4, the light source 11 is omitted. FIG. 4 is conceptual, and does not accurately represent the positional relationship between the components, the traveling direction of light, and the like.

The shield 15 includes a first shield 15-1 and a second shield 15-2. The first shield 15-1 is disposed on an optical path of the modulated light 103-1 modulated in the first modulation region 131. The first shield 15-1 is disposed at a position where an unnecessary region of the first image 135 is shielded. The second shield 15-2 is disposed on an optical path of the modulated light 103-2 modulated in the second modulation region 132. The second shield 15-2 is disposed at a position at which an unnecessary region of the second image 136 is shielded.

Figure 5:
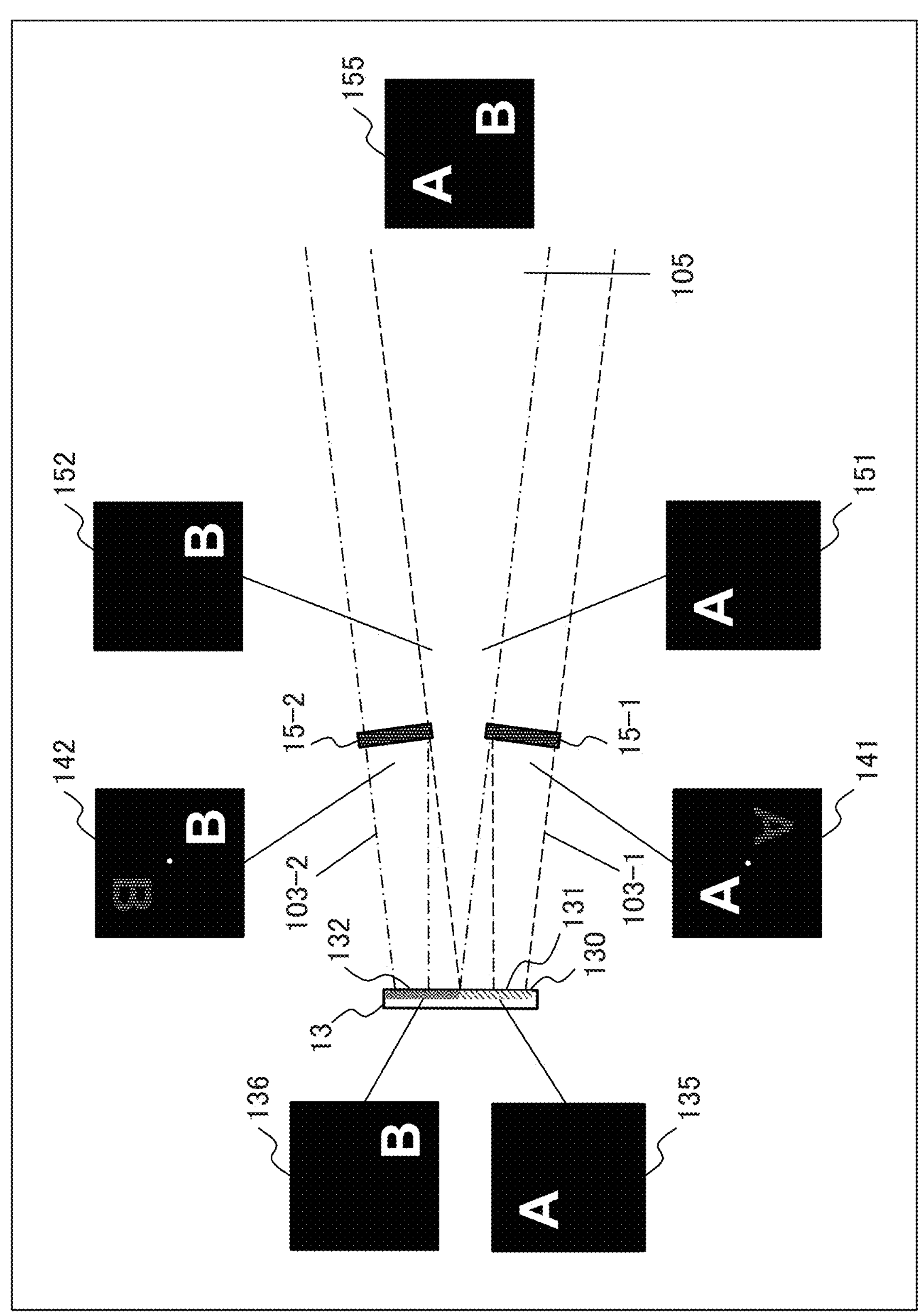
FIG. 5 is a conceptual diagram for describing shielding of unnecessary light components by the shield of the projection device according to the first example embodiment.

FIG. 5 is a conceptual diagram for describing shielding of unnecessary light components by the shield 15. FIG. 5 illustrates an example of an image related to the phase image set in the modulation part 130 of the spatial light modulator 13, an image formed by light before and after the shield 15, and the target image 155 displayed on the face to be projected. The image illustrated in FIG. 5 is conceptual, and does not accurately indicate the size, shape, orientation, position, and the like.

In the first modulation region 131, a phase image related to the first image 135 in the left range of the target image 155 is set. Although FIG. 5 illustrates the first image 135, a phase image for forming the first image 135 is actually set in first modulation region 131. When the first modulation region 131 in which the phase image for forming the first image 135 is set is irradiated with the light 102, the modulated light 103-1 (broken line) for forming the first image 135 is emitted toward the first shield 15-1. The modulated light 103-1 before passing through the first shield 15-1 forms the image 141 including an unnecessary light component. The first shield 15-1 shields the unnecessary light component included in the modulated light 103-1. In other words, the first shield 15-1 shields the unnecessary region (right side) included in the image 141 displayed by the modulated light 103-1 modulated in the first modulation region 131. The modulated light 103-1 that has passed through the first shield 15-1 does not include unnecessary light components such as the 0th-order light 1410 and the ghost image 1412. Therefore, the modulated light 103-1 after passing through the first shield 15-1 forms an image 151 that does not include an unnecessary light component.

In the second modulation region 132, a phase image related to the second image 136 in the right range of the target image 155 is set. Although FIG. 5 illustrates the second image 136, a phase image for forming second image 136 is actually set in second modulation region 132. When the second modulation region 132 in which the phase image for forming the second image 136 is set is irradiated with the light 102, the modulated light 103-2 (alternate long and short dash line) for forming the second image 136 is emitted toward the second shield 15-2. The modulated light 103-2 before passing through the second shield 15-2 forms the image 142 including an unnecessary light component. The second shield 15-2 shields the unnecessary light component included in the modulated light 103-2. In other words, the second shield 15-2 shields the unnecessary region (left side) included in the image 142 displayed by the modulated light 103-2 modulated in the second modulation region 132. The modulated light 103-2 that has passed through the second shield 15-2 does not include unnecessary light components such as the 0th-order light 1420 and the ghost image 1412. Therefore, the modulated light 103-2 after passing through the second shield 15-2 forms an image 152 that does not include an unnecessary light component.

The modulated light 103 that has passed through the shield 15 including the first shield 15-1 and the second shield 15-2 is projected from the projection device 10 as the projection light 105 that does not include unnecessary light components such as 0th-order light and a ghost image. The projection light 105 includes a light component modulated in the first modulation region 131 and a light component modulated in the second modulation region 132. The projection light 105 displays the target image 155 including the desired image 1511 (A) included in the image region of the image 141 and the desired image 1521 (B) included in the image region of the image 142 on the face to be projected.

The control unit 17 controls the light source 11 and the spatial light modulator 13. For example, the control unit 17 is achieved by a microcomputer including a processor and a memory. The control unit 17 sets a phase image related to the image to be projected in each of the first modulation region 131 and the second modulation region 132 in accordance with the aspect ratio of the tiling set in the modulation part 130 of the spatial light modulator 13. For example, the control unit 17 sets, in the modulation part 130, a phase image related to an image according to a use such as an image display, communication, or distance measurement. The phase image of the image to be projected may be stored in advance in a storage unit (not illustrated). The shape and the size of the image to be projected are not particularly limited.

The control unit 17 drives the spatial light modulator 13 in such a way that a parameter that determines a difference between a phase of the light 102 with which the modulation part 130 of the spatial light modulator 13 is irradiated and a phase of the modulated light 103 reflected by the modulation part 130 changes. For example, the parameter is a value related to optical characteristics such as a refractive index and an optical path length. For example, the control unit 17 adjusts the refractive index of the modulation part 130 by changing the voltage applied to the modulation part 130 of the spatial light modulator 13. The phase distribution of the light 102 with which the modulation part 130 of the phase modulating spatial light modulator 13 is irradiated is modulated according to the optical characteristics of the modulation part 130. The method of driving the spatial light modulator 13 by the control unit 17 is determined according to the modulation scheme of the spatial light modulator 13.

In a state where the phase image related to the image to be displayed is set in each of the first modulation region 131 and the second modulation region 132 of the modulation part 130, the control unit 17 drives the emitter 111 of the light source 11. As a result, the modulation part 130 of the spatial light modulator 13 is irradiated with the light 102 emitted from the light source 11 in accordance with the timing at which the phase image is set in the modulation part 130 of the spatial light modulator 13. The light 102 with which the modulation part 130 of the spatial light modulator 13 is irradiated is modulated in each of the first modulation region 131 and the second modulation region 132 of the modulation part 130 of the spatial light modulator 13. The modulated light 103 modulated in each of the first modulation region 131 and the second modulation region 132 of the modulation part 130 of the spatial light modulator 13 travels toward the shield 15.

As described above, the projection device of the present example embodiment includes the light source, the spatial light modulator, the shield, and the control unit. The light source emits light. The spatial light modulator includes the modulation part which is irradiated with light emitted from the light source. In the spatial light modulator, the phase of the light with which the modulation part is irradiated is modulated by the modulation part. The control unit allocates at least two modulation regions to the modulation part of the spatial light modulator. The control unit sets phase images of at least two images constituting the target image in the face to be projected in at least two respective modulation regions. The control unit controls the light source in such a way that the modulation part in which the phase image of each of the at least two images is set is irradiated with light. The shield is disposed on the optical path of the modulated light modulated by the modulation part of the spatial light modulator. The shield transmits, of modulated light modulated in each of at least two modulation regions set in the modulation part of the spatial light modulator, a light component of an image region where a desired image is formed as projection light. The shield shields a light component of an unnecessary region including a ghost image of a desired image. For example, the shield is disposed at a position at which 0th-order light included in modulated light modulated in each of at least two modulation regions is shielded.

The control unit allocates a first modulation region and a second modulation region to the modulation part of the spatial light modulator. The control unit sets phase images of the first image and the second image constituting the target image in the first modulation region and the second modulation region, respectively. The shield is disposed at a position at which a light component of the unnecessary region included in modulated light modulated in each of the first modulation region and the second modulation region is shielded.

In the present example embodiment, the control unit allocates the first modulation region to the left half of the modulation part of the spatial light modulator. The control unit allocates the second modulation region to the right half of the modulation part of the spatial light modulator. The control unit sets the phase image of the first image corresponding to the left half of the target image in the first modulation region. The control unit sets the phase image of the second image corresponding to the right half of the target image in the second modulation region. The shield include a first shield and a second shield. The first shield is disposed at a position at which a light component of an unnecessary region included in modulated light modulated in the first modulation region is shielded. The second shield is disposed at a position at which a light component of an unnecessary region included in modulated light modulated in the second modulation region is shielded.

The projection device according to the present example embodiment displays, on the face to be projected, a target image including the first image formed by a phase distribution set in the first modulation region and the second image formed by a phase distribution set in the second modulation region. The projection device of the present example embodiment does not include a Fourier transform lens or a projection lens. In the projection device of the present example embodiment, each of the two shields shields the light component of the unnecessary region including the ghost image. That is, the projection device of the present example embodiment can project projection light for displaying an image including no ghost image using two shields without using the projection optical system.

Second Example Embodiment

Next, a projection device according to a second example embodiment will be described with reference to the drawings. The projection device of the present example embodiment is different from the projection device of the first example embodiment in that the major axis and the minor axis of the modulation part of the spatial light modulator are interchanged and the modulation part is divided in the horizontal direction.

(Configuration)

Figure 6:
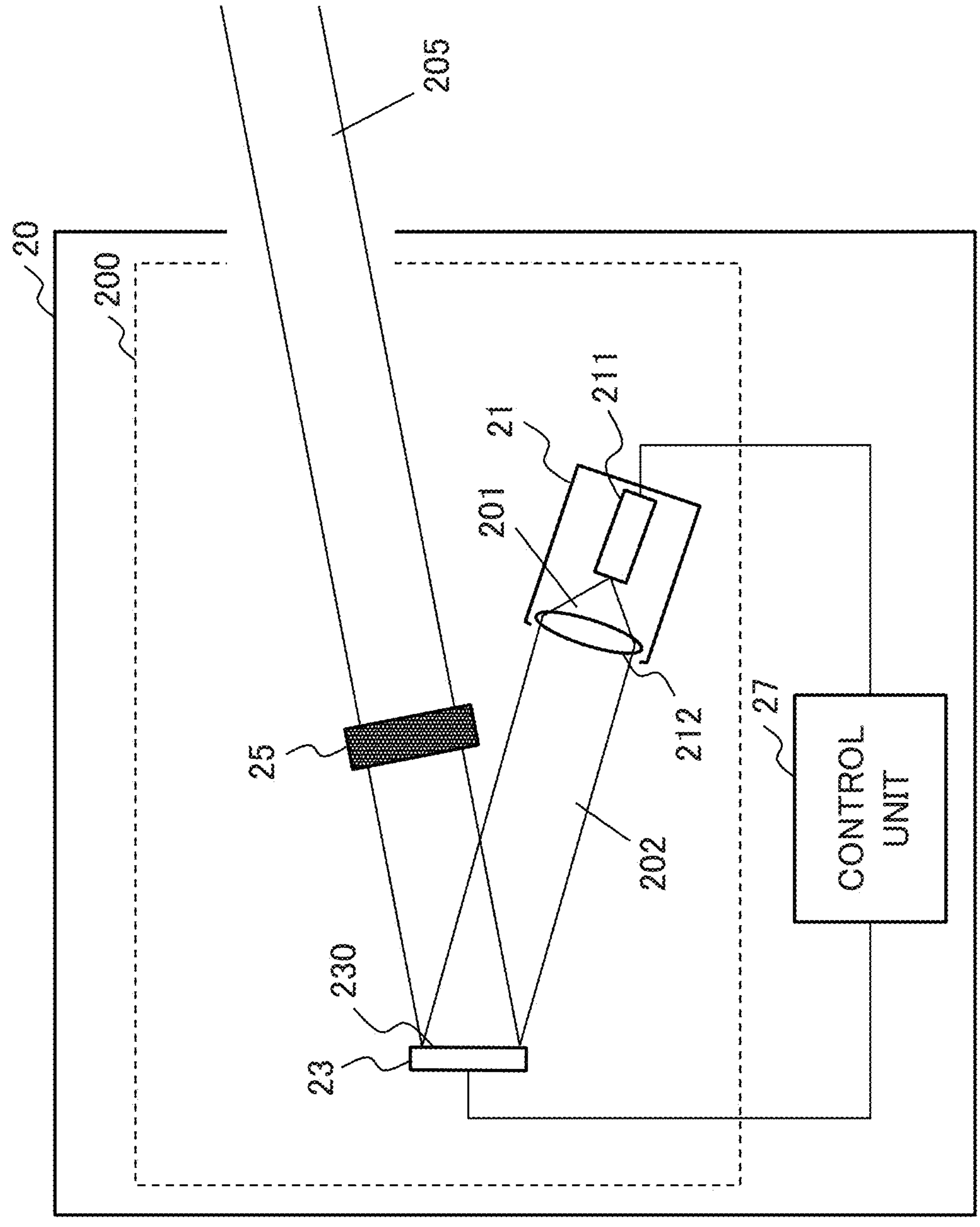
FIG. 6 is a conceptual diagram illustrating an example of a configuration of a projection device according to a second example embodiment.

FIG. 6 is a conceptual diagram illustrating an example of a configuration of a projection device 20 of the present example embodiment. The projection device 20 includes a light source 21, a spatial light modulator 23, a shield 25, and a control unit 27. The light source 21, the spatial light modulator 23, and the shield 25 constitute a projection unit 200. FIG. 6 is a plan view of the internal configuration of the projection device 20 when viewed from above. The internal configuration of the projection device 20 has a configuration in which the internal configuration of the projection device 10 of the first example embodiment is tilted sideways by 90 degrees. FIG. 6 is conceptual, and does not accurately represent the positional relationship between the components, the traveling direction of light, and the like.

The light source 21 has a configuration similar to that of the light source 11 of the first example embodiment. The light source 21 includes an emitter 211 and a lens 212. The emitter 211 emits laser light 201 in a predetermined wavelength band under the control of the control unit 27. The lens 212 enlarges the laser light 201 emitted from the emitter 211 in accordance with the size of a modulation part 230 of the spatial light modulator 23. The laser light 201 emitted from the emitter 211 is enlarged by the lens 212 and emitted from the light source 21. Light 202 emitted from the light source 21 travels toward the modulation part 230 of the spatial light modulator 23.

The spatial light modulator 23 has a configuration similar to that of the spatial light modulator 13 of the first example embodiment. The spatial light modulator 23 includes a modulation part 230 irradiated with the light 202. The modulation part 230 of the spatial light modulator 23 is irradiated with the light 202 emitted from the light source 21. In the modulation part 230 of the spatial light modulator 23, a pattern related to the image displayed by projection light 205 is set according to the control of the control unit 27. The light 202 incident on the modulation part 230 of the spatial light modulator 23 is modulated according to the pattern set in the modulation part 230 of the spatial light modulator 23. Modulated light 203 modulated by the modulation part 230 of the spatial light modulator 23 travels toward the shield 25.

Figure 7:
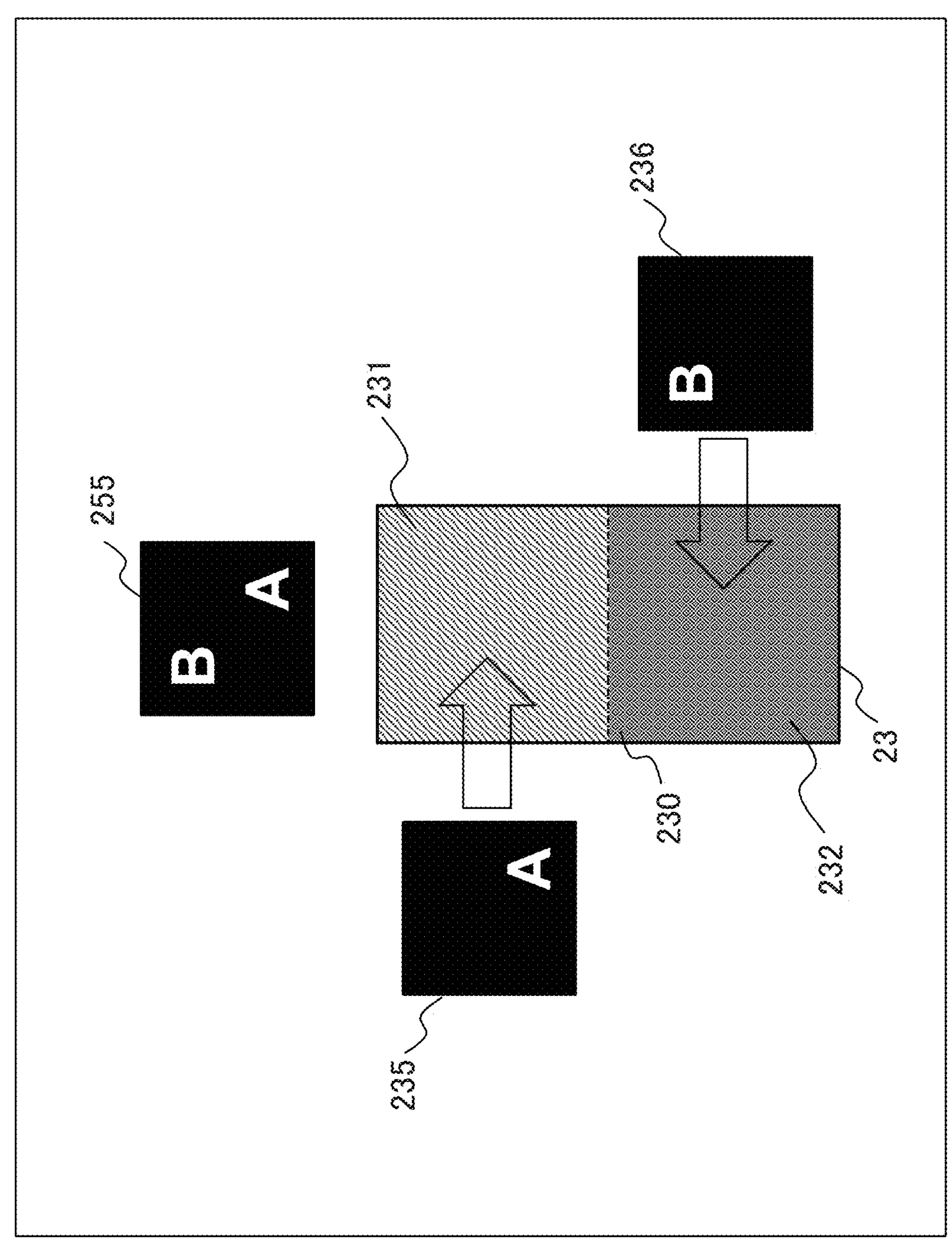
FIG. 7 is a conceptual diagram for describing region division of a modulation part of a spatial light modulator of a projection device according to the second example embodiment.

FIG. 7 is a conceptual diagram for describing region division of the modulation part 230 of the spatial light modulator 23. A first modulation region 231 and a second modulation region 232 are set in the modulation part 230 of the spatial light modulator 23. A phase image related to an image (also referred to as a first image 235) in the lower range of a target image 255 is set in first modulation region 231. The first image 235 includes at least one image (also referred to as a desired image). Although FIG. 7 illustrates the first image 235, a phase image for forming the first image 235 is actually set in the first modulation region 231. A phase image related to an image in the upper range of the target image 255 (also referred to as a second image 236) is set in the second modulation region 232. The second image 236 includes at least one image (also referred to as a desired image). Although FIG. 7 illustrates the second image 236, a phase image for forming second image 236 is actually set in the second modulation region 232. The first image 235, the second image 236, and the target image 255 are examples, and do not limit the image displayed by the projection light projected from the projection device 20.

Figure 8:
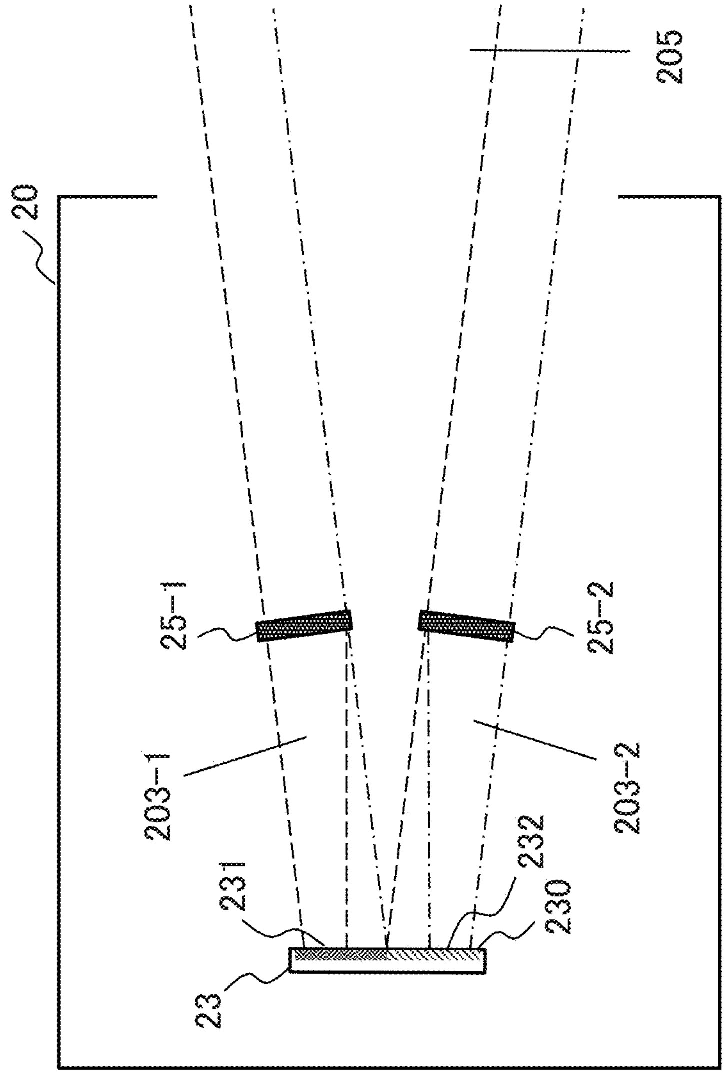
FIG. 8 is a conceptual diagram illustrating a state in which modulated light modulated by a modulation part of a spatial light modulator of a projection device according to the second example embodiment is projected as projection light.

FIG. 8 is a conceptual diagram illustrating a state in which the modulated light 203 modulated by the modulation part 230 of the spatial light modulator 23 is projected as the projection light 205. FIG. 8 is a side view of the internal configuration of the projection device 20 when viewed from the side. In FIG. 8, the light source 21 is omitted. FIG. 8 is conceptual, and does not accurately represent the positional relationship between the components, the traveling direction of light, and the like.

The shield 25 has a configuration similar to that of the shield 15 of the first example embodiment. The shield 25 includes a first shield 25-1 and a second shield 25-2. The first shield 25-1 is disposed on an optical path of modulated light 203-1 modulated in the first modulation region 231. The first shield 25-1 is disposed at a position where an unnecessary region of the first image 235 is shielded. The second shield 25-2 is disposed on an optical path of modulated light 203-2 modulated in the second modulation region 232. The second shield 25-2 is disposed at a position at which an unnecessary region of the second image 236 is shielded.

Figure 9:
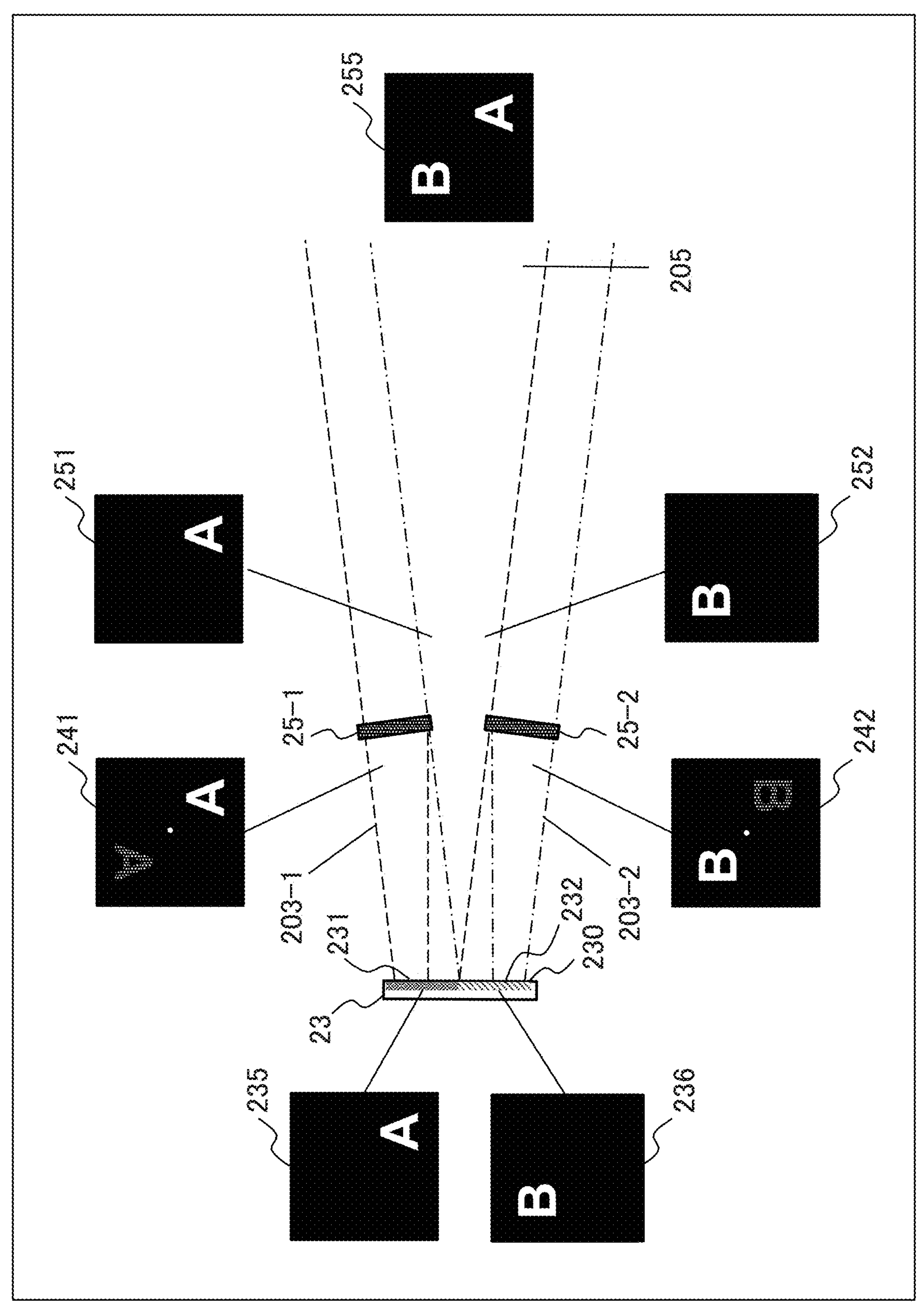
FIG. 9 is a conceptual diagram for describing shielding of unnecessary light components by the shield of the projection device according to the second example embodiment.

FIG. 9 is a conceptual diagram for describing shielding of unnecessary light components by the shield 25. FIG. 9 illustrates an example of an image related to the phase image set in the modulation part 230 of the spatial light modulator 23, an image formed by light before and after the shield 25, and a target image displayed on the face to be projected. The image illustrated in FIG. 9 is conceptual, and does not accurately indicate the size, shape, orientation, position, and the like.

In the first modulation region 231, a phase image related to the first image 235 in the lower range of the target image 255 is set. Although FIG. 9 illustrates the first image 235, a phase image for forming the first image 235 is actually set in the first modulation region 231. When the first modulation region 231 in which the phase image for forming the first image 235 is set is irradiated with the light 202, the modulated light 203-1 (broken line) for forming the first image 235 is emitted toward the first shield 25-1. The modulated light 203-1 before passing through the first shield 25-1 forms an image 241 including an unnecessary light component. The first shield 25-1 shields the unnecessary light component included in the modulated light 203-1. In other words, the first shield 25-1 shields the unnecessary region (upper side) included in the image 241 displayed by the modulated light 203-1 modulated in the first modulation region 231. The modulated light 203-1 that has passed through the first shield 25-1 does not include unnecessary light components such as 0th-order light and a ghost image. Therefore, the modulated light 203-1 after passing through the first shield 25-1 forms an image 251 that does not include an unnecessary light component.

In the second modulation region 232, a phase image related to the second image 236 in the upper range of the target image 255 is set. Although FIG. 9 illustrates the second image 236, a phase image for forming second image 236 is actually set in the second modulation region 232. When the second modulation region 232 in which the phase image for forming the second image 236 is set is irradiated with the light 202, the modulated light 203-2 (alternate long and short dash line) for forming the second image 236 is emitted toward the second shield 25-2. The modulated light 203-2 before passing through the second shield 25-2 forms an image 242 including an unnecessary light component. The second shield 25-2 shields the unnecessary light component included in the modulated light 203-2. In other words, the second shield 25-2 shields the unnecessary region (lower side) included in the image 242 displayed by the modulated light 203-2 modulated in the second modulation region 232. The modulated light 203-2 that has passed through the second shield 25-2 does not include unnecessary light components such as 0th-order light and a ghost image. Therefore, the modulated light 203-2 after passing through the second shield 25-2 forms an image 252 that does not include an unnecessary light component.

The modulated light 203 that has passed through the shield 25 including the first shield 25-1 and the second shield 25-2 is projected as the projection light 205 that does not include unnecessary light components such as 0th-order light and a ghost image. The projection light 205 includes a light component modulated in the first modulation region 231 and a light component modulated in the second modulation region 232. The projection light 205 displays the target image 255 including the desired image (A) included in the image region of the image 241 and the desired image (B) included in the image region of the image 242 on the face to be projected.

The control unit 27 has a configuration similar to that of the control unit 17 of the first example embodiment. The control unit 27 controls the light source 21 and the spatial light modulator 23. The control unit 27 sets a phase image related to the image to be projected in each of the first modulation region 231 and the second modulation region 232 in accordance with the aspect ratio of the tiling set in the modulation part 230 of the spatial light modulator 23.

In a state where the phase image related to the image to be displayed is set in each of the first modulation region 231 and the second modulation region 232 of the modulation part 230, the control unit 27 drives the emitter 211 of the light source 21. As a result, the modulation part 230 of the spatial light modulator 23 is irradiated with the light 202 emitted from the light source 21 in accordance with the timing at which the phase image is set in the modulation part 230 of the spatial light modulator 23. The light 202 with which the modulation part 230 of the spatial light modulator 23 is irradiated is modulated in each of the first modulation region 231 and the second modulation region 232 of the modulation part 230 of the spatial light modulator 23. The modulated light 203 modulated in each of the first modulation region 231 and the second modulation region 232 of the modulation part 230 of the spatial light modulator 23 travels toward the shield 25.

As described above, the projection device of the present example embodiment includes the light source, the spatial light modulator, the shield, and the control unit. The light source emits light. The spatial light modulator includes the modulation part which is irradiated with light emitted from the light source. In the spatial light modulator, the phase of the light with which the modulation part is irradiated is modulated by the modulation part. The control unit allocates at least two modulation regions to the modulation part of the spatial light modulator. The control unit sets phase images of at least two images constituting the target image in the face to be projected in at least two respective modulation regions. The control unit controls the light source in such a way that the modulation part in which the phase image of each of the at least two images is set is irradiated with light. The shield is disposed on the optical path of the modulated light modulated by the modulation part of the spatial light modulator. The shield transmits, of modulated light modulated in each of at least two modulation regions set in the modulation part of the spatial light modulator, a light component of an image region where a desired image is formed as projection light. The shield shields a light component of an unnecessary region including a ghost image of a desired image. For example, the shield is disposed at a position at which 0th-order light included in modulated light modulated in each of at least two modulation regions is shielded.

The control unit allocates a first modulation region and a second modulation region to the modulation part of the spatial light modulator. The control unit sets phase images of the first image and the second image constituting the target image in the first modulation region and the second modulation region, respectively. The shield is disposed at a position at which a light component of the unnecessary region included in modulated light modulated in each of the first modulation region and the second modulation region is shielded.

In the present example embodiment, the control unit allocates the first modulation region to the upper half of the modulation part of the spatial light modulator. The control unit allocates the second modulation region to the lower half of the modulation part of the spatial light modulator. The control unit sets the phase image of the first image corresponding to the lower half of the target image in the first modulation region. The control unit sets the phase image of the second image corresponding to the upper half of the target image in the second modulation region. The shield include a first shield and a second shield. The first shield is disposed at a position at which a light component of an unnecessary region included in modulated light modulated in the first modulation region is shielded. The second shield is disposed at a position at which a light component of an unnecessary region included in modulated light modulated in the second modulation region is shielded.

The projection device according to the present example embodiment displays, on the face to be projected, a target image including the first image formed by a phase distribution set in the first modulation region and the second image formed by a phase distribution set in the second modulation region. The projection device of the present example embodiment does not include a Fourier transform lens or a projection lens. In the projection device of the present example embodiment, each of the two shields shields the light component of the unnecessary region including the ghost image. That is, the projection device of the present example embodiment can project projection light for displaying an image including no ghost image using two shields without using the projection optical system.

Third Example Embodiment

Next, a projection device according to a third example embodiment will be described with reference to the drawings. The projection device of the present example embodiment is different from the projection device of the first example embodiment in that an unnecessary light component is shielded using a single shield. The projection device of the present example embodiment may be combined with the configuration of the projection device of the second example embodiment. In the present example embodiment, a system in which a modulation part of a spatial light modulator is divided into two on the left and right will be described. The method of the present example embodiment can also be applied to a system in which a modulation part of a spatial light modulator is vertically divided into two.

(Configuration)

Figure 10:
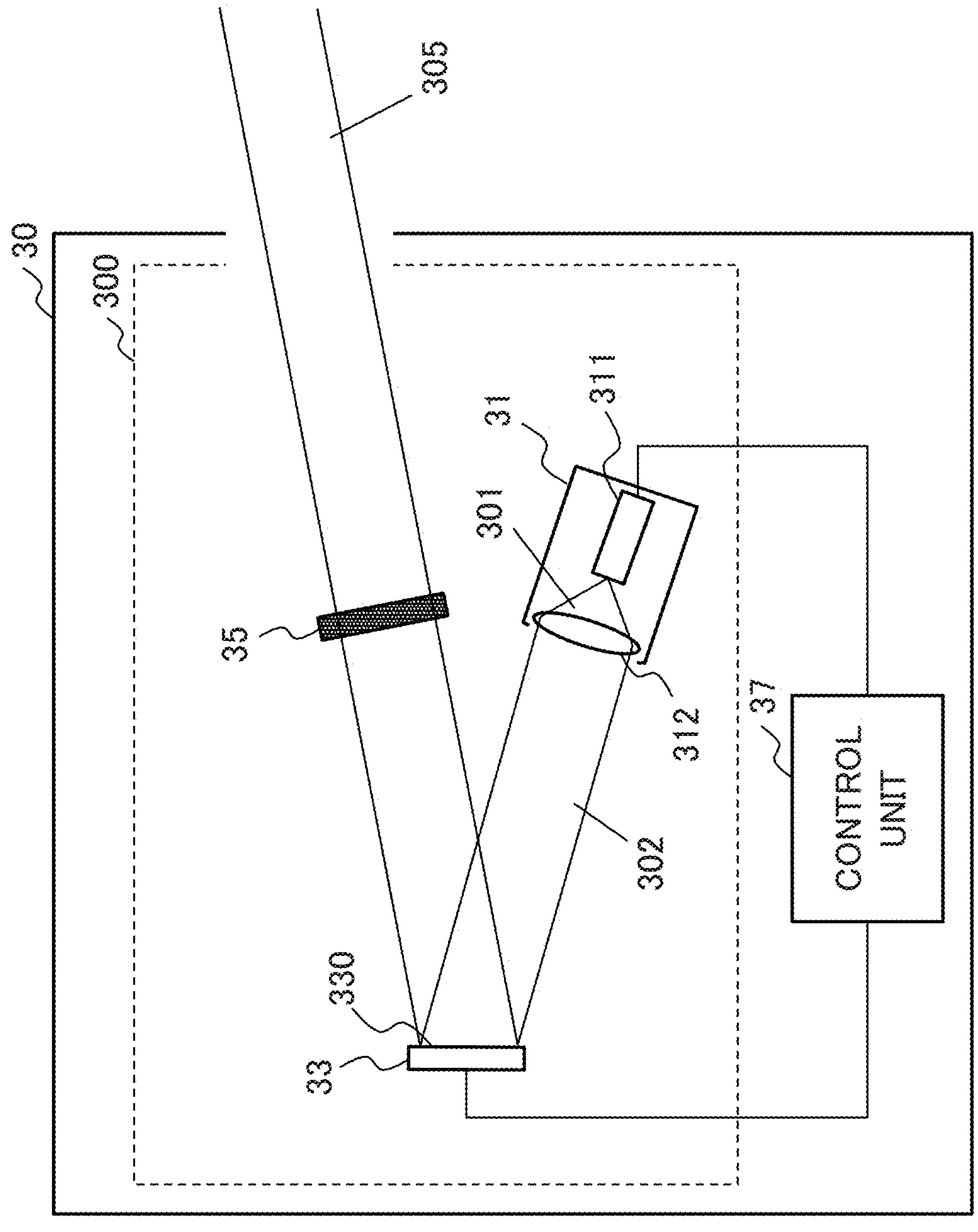
FIG. 10 is a conceptual diagram illustrating an example of a configuration of a projection device according to a third example embodiment.

FIG. 10 is a conceptual diagram illustrating an example of a configuration of a projection device 30 of the present example embodiment. The projection device 30 includes a light source 31, a spatial light modulator 33, a shield 35, and a control unit 37. The light source 31, the spatial light modulator 33, and the shield 35 constitute a projection unit 300. FIG. 10 is a side view of the internal configuration of the projection device 30 when viewed from the side. The shield 35 is a single part. FIG. 10 is conceptual, and does not accurately represent the positional relationship between the components, the traveling direction of light, and the like.

The light source 31 has a configuration similar to that of the light source 11 of the first example embodiment. The light source 31 includes an emitter 311 and a lens 312. The emitter 311 emits laser light 301 in a predetermined wavelength band under the control of the control unit 37. The lens 312 enlarges the laser light 301 emitted from the emitter 311 in accordance with the size of a modulation part 330 of the spatial light modulator 33. The laser light 301 emitted from the emitter 311 is enlarged by the lens 312 and emitted from the light source 31. Light 302 emitted from the light source 31 travels toward the modulation part 330 of the spatial light modulator 33.

The spatial light modulator 33 has a configuration similar to that of the spatial light modulator 13 of the first example embodiment. The spatial light modulator 33 includes a modulation part 330 irradiated with the light 302. Region division of the modulation part 330 of the spatial light modulator 33 is similar to that of the first example embodiment. The modulation part 330 of the spatial light modulator 33 is irradiated with the light 302 emitted from the light source 31. In the modulation part 330 of the spatial light modulator 33, a pattern related to the image displayed by projection light 305 is set according to the control of the control unit 37. The light 302 incident on the modulation part 330 of the spatial light modulator 33 is modulated according to the pattern set in the modulation part 330 of the spatial light modulator 33. Modulated light 303 modulated by the modulation part 330 of the spatial light modulator 33 travels toward the shield 35.

Figure 11:
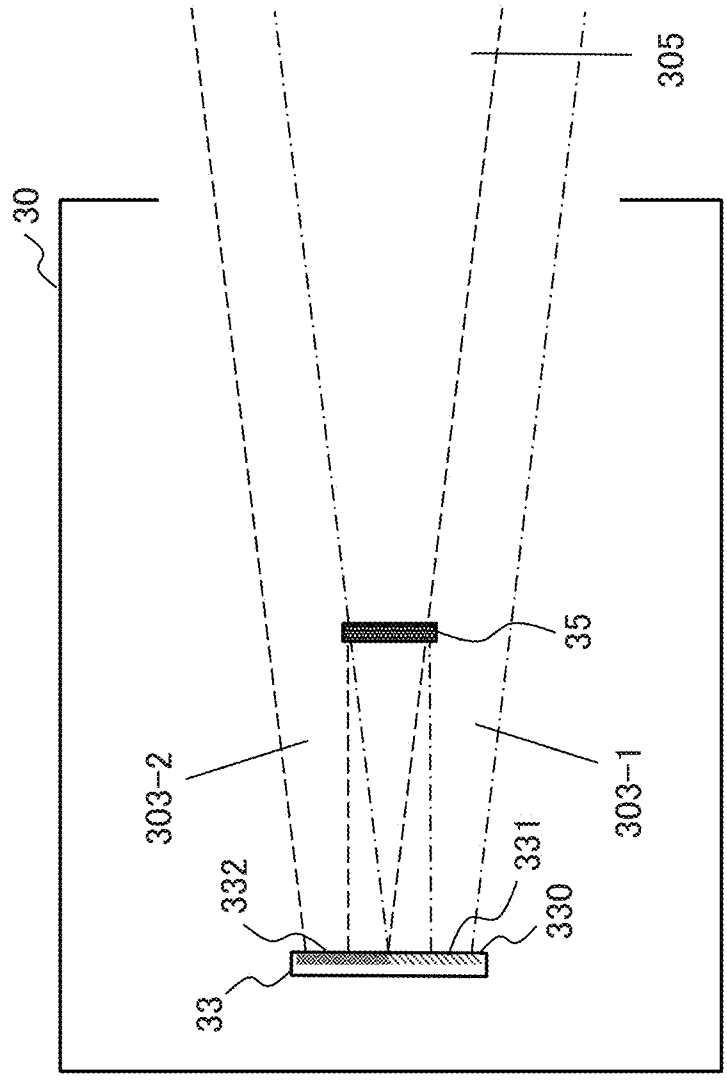
FIG. 11 is a conceptual diagram illustrating a state in which modulated light modulated by a modulation part of a spatial light modulator of a projection device according to the third example embodiment is projected as projection light.

FIG. 11 is a conceptual diagram illustrating a state in which the modulated light 303 modulated by the modulation part 330 of the spatial light modulator 33 is projected as the projection light 305. FIG. 11 is a side view of the internal configuration of the projection device 30 when viewed from above. In FIG. 11, the light source 31 is omitted. FIG. 11 is conceptual, and does not accurately represent the positional relationship between the components, the traveling direction of light, and the like. A first modulation region 331 and a second modulation region 332 are set in the modulation part 330 of the spatial light modulator 33. A phase image related to an image (also referred to as a first image) in the right range of the target image is set in the first modulation region 331. A phase image related to an image (also referred to as a second image) in the left range of the target image is set in the second modulation region 332. Each of the first image and the second image includes at least one image (also referred to as a desired image).

Figure 12:
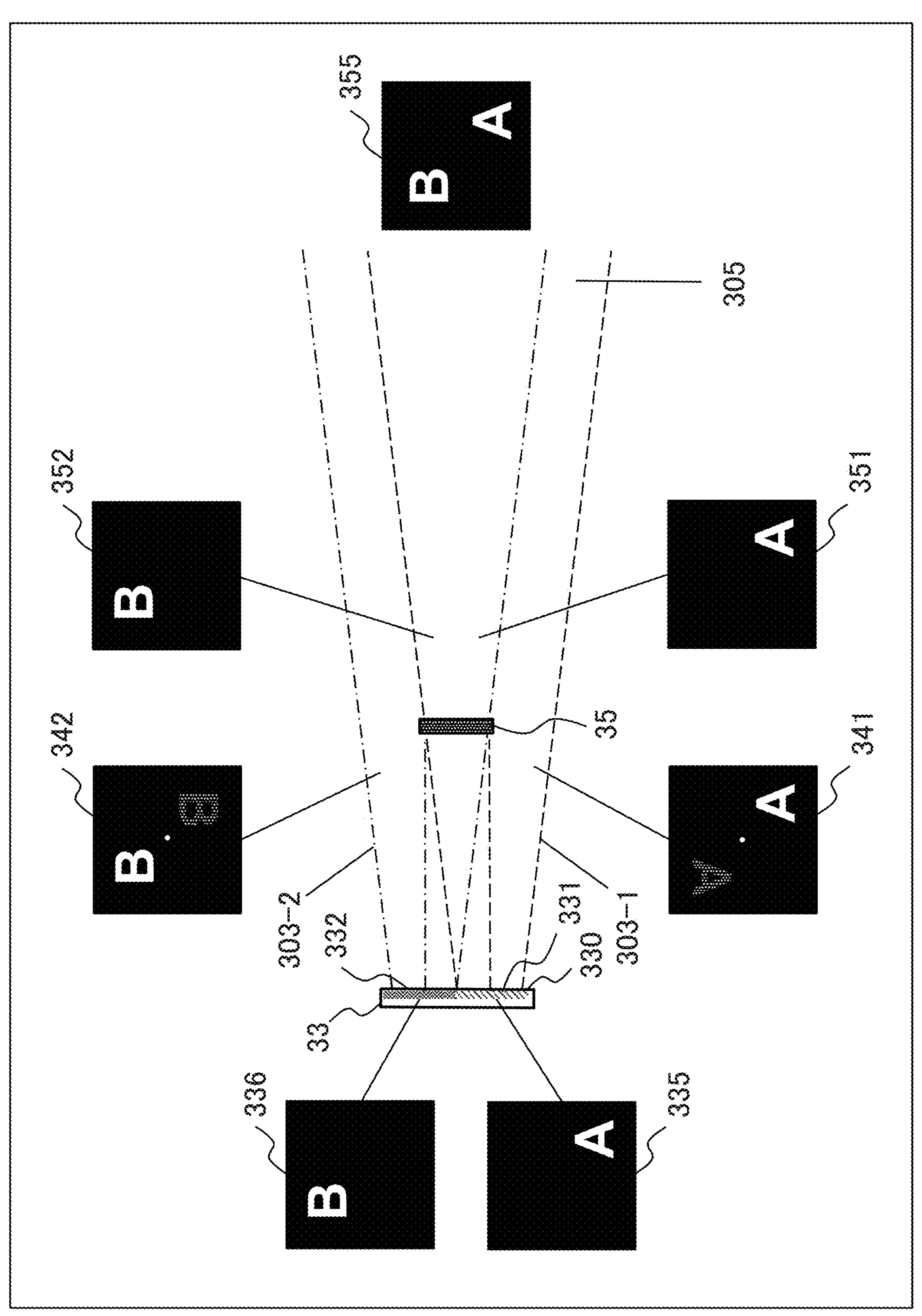
FIG. 12 is a conceptual diagram for describing shielding of unnecessary light components by the shield of the projection device according to the third example embodiment.

The shield 35 is disposed on an optical path of modulated light 303-1 modulated in the first modulation region 331 and modulated light 303-2 modulated in the second modulation region 332. The shield 35 is disposed at a position at which an unnecessary region of the first image and an unnecessary region of the second image is shielded. In the example of FIG. 12, the shield 35 is disposed at the center of the optical path of the modulated light 303.

FIG. 12 is a conceptual diagram for describing shielding of unnecessary light components by the shield 35. FIG. 12 illustrates an example of an image related to the phase image set in the modulation part 330 of the spatial light modulator 33, an image formed by light before and after the shield 35, and a target image displayed on the face to be projected. The image illustrated in FIG. 12 is conceptual, and does not accurately indicate the size, shape, orientation, position, and the like.

In the first modulation region 331, a phase image related to a first image 335 in the right range of a target image 355 is set. Although FIG. 12 illustrates the first image 335, a phase image for forming the first image 335 is actually set in the first modulation region 331. When the first modulation region 331 in which the phase image for forming the first image 335 is set is irradiated with the light 302, the modulated light 303-1 (broken line) for forming the first image 335 is emitted toward the shield 35. The modulated light 303-1 before passing through the shield 35 forms an image 341 including an unnecessary light component. The shield 35 shields the unnecessary light component included in the modulated light 303-1. In other words, the shield 35 shields the unnecessary region (left side) included in the image 341 displayed by the modulated light 303-1 modulated in the first modulation region 331. The modulated light 303-1 that has passed through the shield 35 does not include unnecessary light components such as 0th-order light and a ghost image. Therefore, the modulated light 303-1 after passing through the shield 35 forms an image 351 that does not include an unnecessary light component.

In the second modulation region 332, a phase image related to a second image 336 in the left range of the target image 355 is set. Although FIG. 12 illustrates the second image 336, a phase image for forming second image 336 is actually set in the second modulation region 332. When the second modulation region 332 in which the phase image for forming the second image 336 is set is irradiated with the light 302, the modulated light 303-2 (alternate long and short dash line) for forming the second image 336 is emitted toward the shield 35. The modulated light 303-2 before passing through the shield 35 forms an image 342 including an unnecessary light component. The shield 35 shields the unnecessary light component included in the modulated light 303-2. In other words, the shield 35 shields the unnecessary region (right side) included in the image 342 displayed by the modulated light 303-2 modulated in the second modulation region 332. The modulated light 303-2 that has passed through the shield 35 does not include unnecessary light components such as 0th-order light and a ghost image. Therefore, the modulated light 303-2 after passing through the shield 35 forms an image 352 that does not include an unnecessary light component.

The modulated light 303 that has passed through the shield 35 is projected as the projection light 305 that does not include unnecessary light components such as 0th-order light and a ghost image. The projection light 305 includes a light component modulated in the first modulation region 331 and a light component modulated in the second modulation region 332. The projection light 305 displays the target image 355 including the desired image (A) included in the image region of the image 341 and the desired image (B) included in the image region of the image 342 on the face to be projected.

The control unit 37 has a configuration similar to that of the control unit 17 of the first example embodiment. The control unit 37 controls the light source 31 and the spatial light modulator 33. The control unit 37 sets a phase image related to the image to be projected in each of the first modulation region 331 and the second modulation region 332 in accordance with the aspect ratio of the tiling set in the modulation part 330 of the spatial light modulator 33.

In a state where the phase image related to the displayed image is set in each of the first modulation region 331 and the second modulation region 332 of the modulation part 330, the control unit 37 drives the emitter 311 of the light source 31. As a result, the modulation part 330 of the spatial light modulator 33 is irradiated with the light 302 emitted from the light source 31 in accordance with the timing at which the phase image is set in the modulation part 330 of the spatial light modulator 33. The light 302 with which the modulation part 330 of the spatial light modulator 33 is irradiated is modulated in each of the first modulation region 331 and the second modulation region 332 of the modulation part 330 of the spatial light modulator 33. The modulated light 303 modulated in each of the first modulation region 331 and the second modulation region 332 of the modulation part 330 of the spatial light modulator 33 travels toward the shield 35.

As described above, the projection device of the present example embodiment includes the light source, the spatial light modulator, the shield, and the control unit. The light source emits light. The spatial light modulator includes the modulation part which is irradiated with light emitted from the light source. In the spatial light modulator, the phase of the light with which the modulation part is irradiated is modulated by the modulation part. The control unit allocates at least two modulation regions to the modulation part of the spatial light modulator. The control unit sets phase images of at least two images constituting the target image in the face to be projected in at least two respective modulation regions. The control unit controls the light source in such a way that the modulation part in which the phase image of each of the at least two images is set is irradiated with light. The shield is disposed on the optical path of the modulated light modulated by the modulation part of the spatial light modulator. The shield transmits, of modulated light modulated in each of at least two modulation regions set in the modulation part of the spatial light modulator, a light component of an image region where a desired image is formed as projection light. The shield shields a light component of an unnecessary region including a ghost image of a desired image. For example, the shield is disposed at a position at which 0th-order light included in modulated light modulated in each of at least two modulation regions is shielded.

The control unit allocates a first modulation region and a second modulation region to the modulation part of the spatial light modulator. The control unit sets phase images of the first image and the second image constituting the target image in the first modulation region and the second modulation region, respectively. The shield is disposed at a position at which a light component of the unnecessary region included in modulated light modulated in each of the first modulation region and the second modulation region is shielded.

In the present example embodiment, the control unit allocates the first modulation region to the left half of the modulation part of the spatial light modulator. The control unit allocates the second modulation region to the right half of the modulation part of the spatial light modulator. The control unit sets the phase image of the first image corresponding to the right half of the target image in the first modulation region. The control unit sets the phase image of the second image corresponding to the left half of the target image in the second modulation region. The shield is disposed at a position at which a light component of the unnecessary region included in the modulated light modulated in the first modulation region and a light component of the unnecessary region included in the modulated light modulated in the second modulation region are shielded.

In an aspect of the present example embodiment, the control unit allocates the first modulation region to the upper half of the modulation part of the spatial light modulator. The control unit allocates the second modulation region to the lower half of the modulation part of the spatial light modulator. The control unit sets the phase image of the first image corresponding to the upper half of the target image in the first modulation region. The control unit sets the phase image of the second image corresponding to the lower half of the target image in the second modulation region. The shield is disposed at a position at which a light component of the unnecessary region included in the modulated light modulated in the first modulation region and a light component of the unnecessary region included in the modulated light modulated in the second modulation region are shielded.

The projection device according to the present example embodiment displays, on the face to be projected, a target image including the first image formed by a phase distribution set in the first modulation region and the second image formed by a phase distribution set in the second modulation region. The projection device according to the present example embodiment, a single shield shields the light component of the unnecessary region including the ghost image. That is, the projection device of the present example embodiment can project projection light for displaying an image including no ghost image using a single shield without using the projection optical system.

Fourth Example Embodiment

Next, a projection device according to a fourth example embodiment will be described with reference to the drawings. A projection device of the present example embodiment is different from the projection device of the first example embodiment in that it includes a curved surface mirror that enlarges and projects projection light. The projection device of the present example embodiment may be combined with the projection devices of the second to third example embodiments.

(Configuration)

Figure 13:
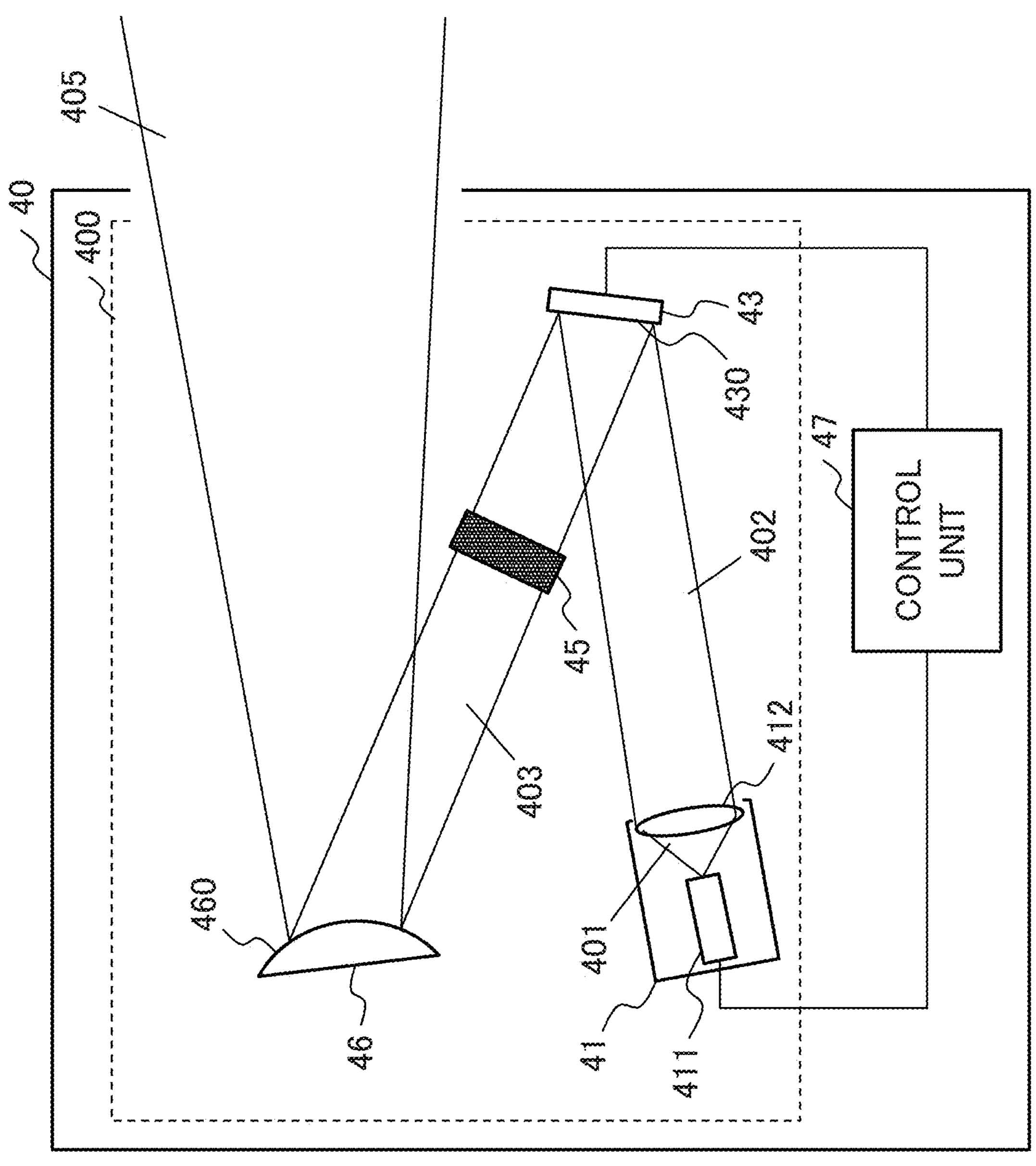
FIG. 13 is a conceptual diagram illustrating an example of a configuration of a projection device according to a fourth example embodiment.

FIG. 13 is a conceptual diagram illustrating an example of a configuration of a projection device 40 of the present example embodiment. The projection device 40 includes a light source 41, a spatial light modulator 43, a shield 45, a curved surface mirror 46, and a control unit 47. The light source 41, the spatial light modulator 43, the curved surface mirror 46, and the shield 45 constitute a projection unit 400. FIG. 13 is a side view of the internal configuration of the projection device 30 when viewed from the side. FIG. 13 is conceptual, and does not accurately represent the positional relationship between the components, the traveling direction of light, and the like.

The light source 41 has a configuration similar to that of the light source 11 of the first example embodiment. The light source 41 includes an emitter 411 and a lens 412. The emitter 411 emits laser light 401 in a predetermined wavelength band under the control of the control unit 47. The lens 412 enlarges the laser light 401 emitted from the emitter 411 in accordance with the size of a modulation part 430 of the spatial light modulator 43. The laser light 401 emitted from the emitter 411 is enlarged by the lens 412 and emitted from the light source 41. Light 402 emitted from the light source 41 travels toward the modulation part 430 of the spatial light modulator 43.

The spatial light modulator 43 has a configuration similar to that of the spatial light modulator 13 of the first example embodiment. The spatial light modulator 43 includes the modulation part 430 irradiated with the light 402. Region division of the modulation part 430 of the spatial light modulator 43 is similar to that of the first example embodiment. The modulation part 430 of the spatial light modulator 43 is irradiated with the light 402 emitted from the light source 41. In the modulation part 430 of the spatial light modulator 43, a pattern related to the image displayed by projection light 405 is set according to the control of the control unit 47. The light 402 incident on the modulation part 430 of the spatial light modulator 43 is modulated according to the pattern set in the modulation part 430 of the spatial light modulator 43. Modulated light 403 modulated by the modulation part 430 of the spatial light modulator 43 travels toward the shield 45. Modulated light 403 includes modulated light 403-1 modulated in a first modulation region 431 and modulated light 403-2 modulated in a second modulation region 432.

Figure 14:
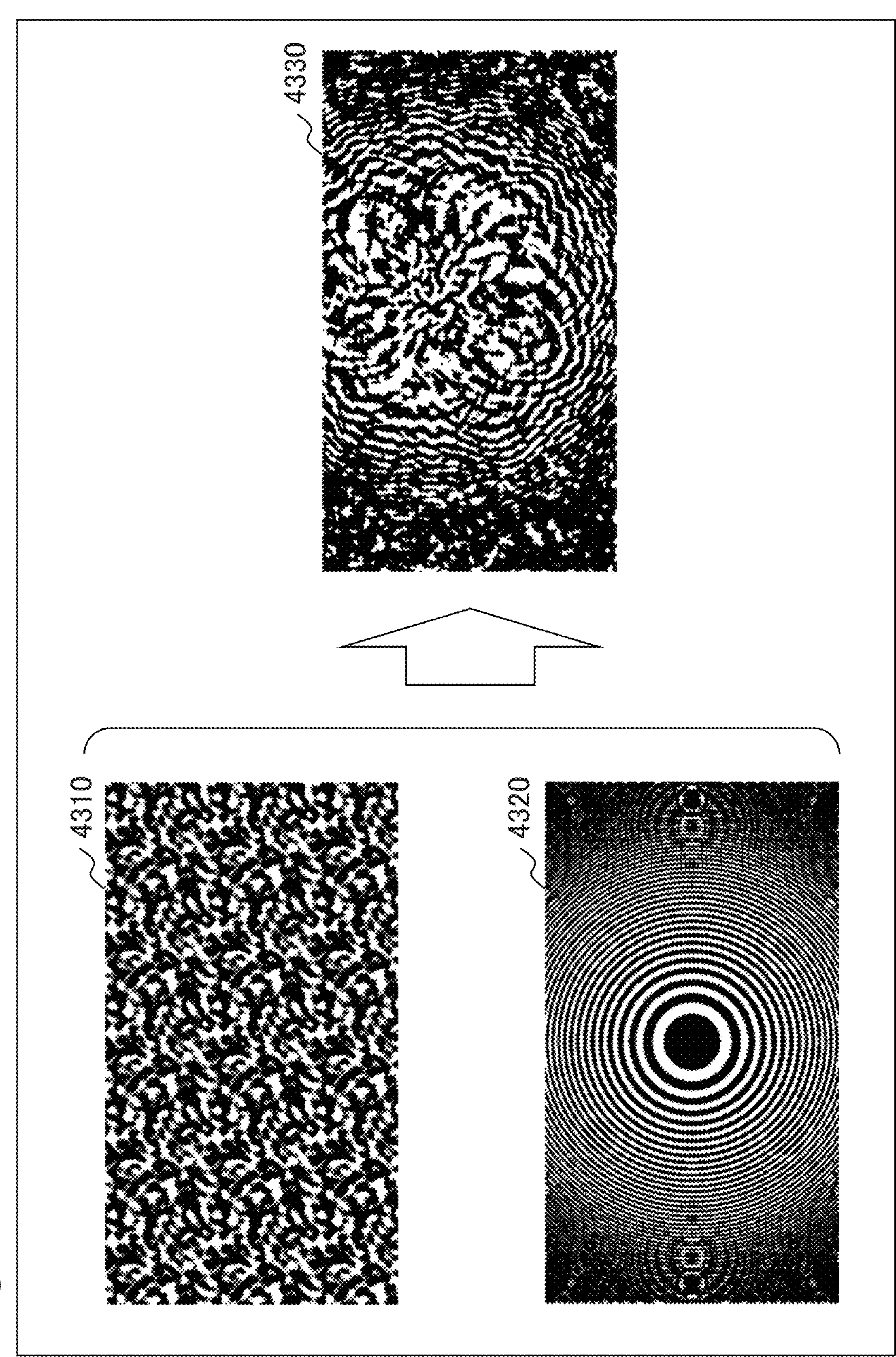
FIG. 14 is a conceptual diagram for describing a composite image set in a modulation part of a spatial light modulator of a projection device according to the fourth example embodiment.

FIG. 14 is a conceptual diagram illustrating an example of a pattern set in the modulation part 430 of the spatial light modulator 43 by the control unit 47. A composite image 4330 is set in the modulation part 430 of the spatial light modulator 43. The composite image 4330 is a pattern obtained by combining a phase image 4310 and a virtual lens image 4320. Phase image 4310 is a pattern for forming a desired image on the face to be projected. The virtual lens image 4320 is a pattern for condensing light for forming a desired image. As in diffraction, the wavefront of light can be controlled by phase control. When the phase changes to a spherical shape, a spherical difference is generated in the wavefront, and a lens effect is generated. The virtual lens image 4320 changes the phase of the light 402 with which the modulation part 430 of the spatial light modulator 43 is irradiated into a spherical shape, and generates a lens effect of condensing the light at a position (also referred to as a second condensing point) of a predetermined focal distance. The image collected by virtual lens image 4320 is formed on a reflecting surface 460 of the curved surface mirror 46. For example, the composite image 4330 may be generated in advance and stored in a storage unit (not illustrated). FIG. 14 is an example, and does not limit the patterns of the phase image 4310, the virtual lens image 4320, and the composite image 4330. The composite image 4330 obtained by combining the phase image 4310 and the virtual lens image 4320 can also be applied to the first to third example embodiments.

Figure 15:
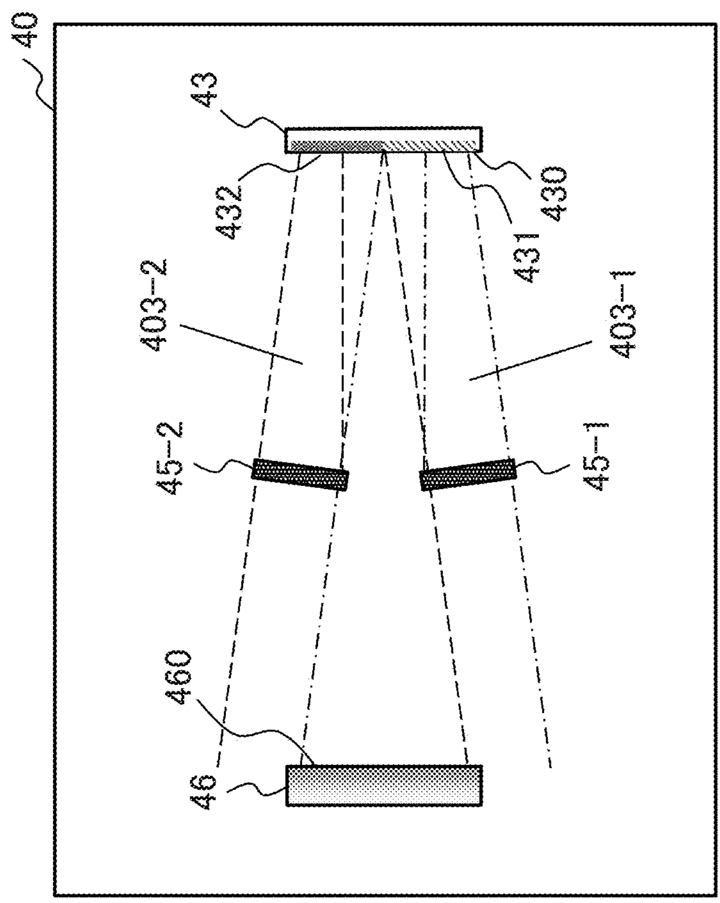
FIG. 15 is a conceptual diagram illustrating a state in which modulated light modulated by a modulation part of the spatial light modulator of the projection device according to the fourth example embodiment travels toward a curved surface mirror.

FIG. 15 is a conceptual diagram illustrating a state in which modulated light 403 modulated by the modulation part 430 of spatial light modulator 43 travels toward the curved surface mirror 46. FIG. 15 is a side view of the internal configuration of the projection device 40 when viewed from above. In FIG. 15, the light source 41 is omitted. FIG. 15 is conceptual, and does not accurately represent the positional relationship between the components, the traveling direction of light, and the like. The first modulation region 431 and the second modulation region 432 are set in the modulation part 430 of the spatial light modulator 43. A phase image related to an image (also referred to as a first image) in the right range of the mirror image of the target image is set in the first modulation region 431. A phase image related to an image (also referred to as a second image) in the left range of the mirror image of the target image is set in the second modulation region 432. Each of the first image and the second image includes at least one image (also referred to as a desired image).

The shield 45 has a configuration similar to that of the shield 15 of the first example embodiment. The shield 45 includes a first shield 45-1 and a second shield 45-2. The first shield 45-1 is disposed on an optical path of the modulated light 403-1 modulated in the first modulation region 431. The first shield 45-1 is disposed is disposed at a position at which an unnecessary region of the first image 435 is shielded. The second shield 45-2 is disposed on an optical path of the modulated light 403-2 modulated in the second modulation region 432. The second shield 45-2 is disposed is disposed at a position at which an unnecessary region of the second image 436 is shielded.

Figure 16:
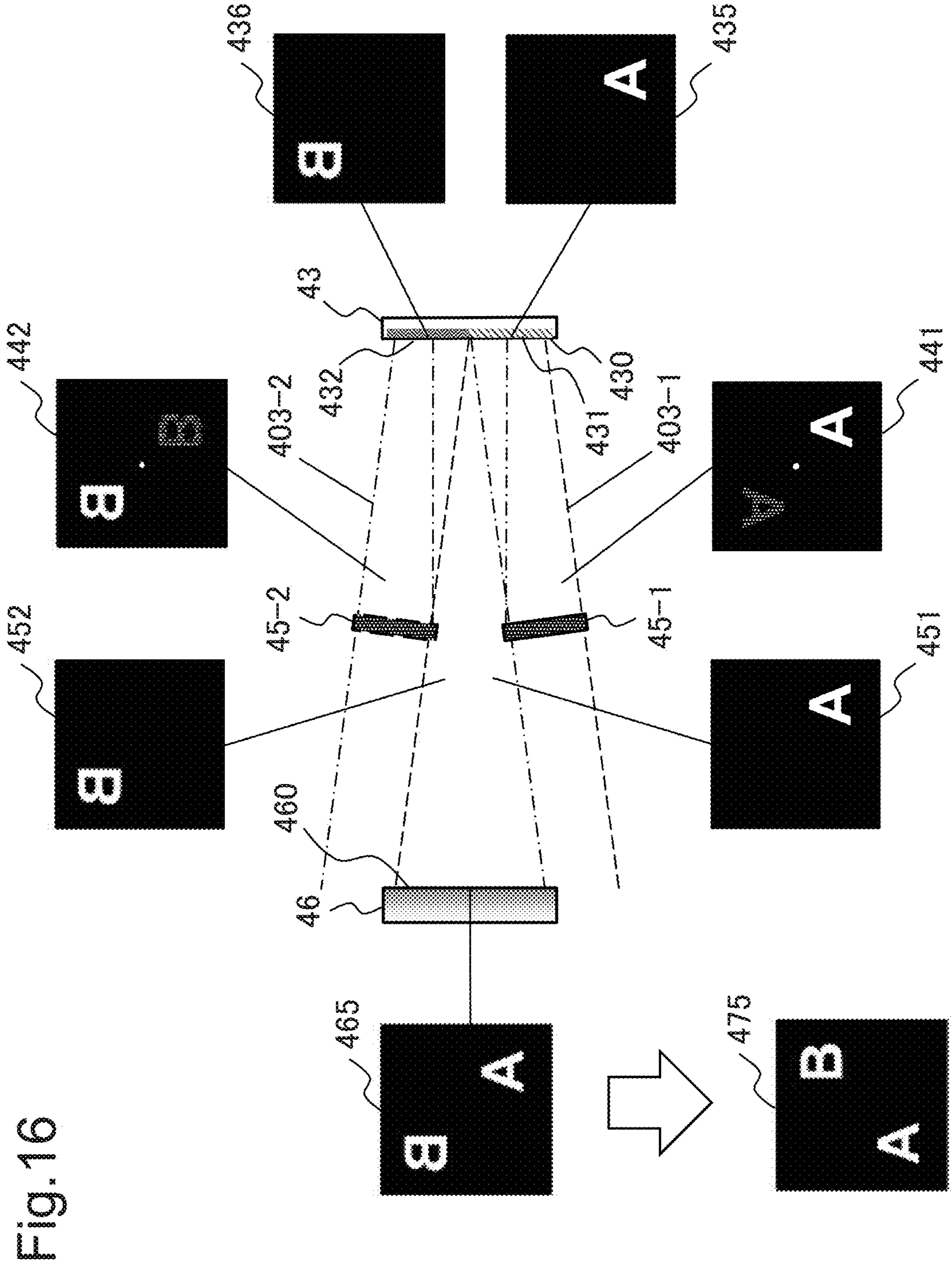
FIG. 16 is a conceptual diagram for describing shielding of unnecessary light components by the shield of the projection device according to the fourth example embodiment.

FIG. 16 is a conceptual diagram for describing shielding of unnecessary light components by the shield 45. FIG. 16 illustrates an example of an image related to the phase image set in the modulation part 430 of the spatial light modulator 43, an image formed by light before and after the shield 45, an image displayed on the reflecting surface 460 of the curved surface mirror 46, and a target image displayed on the face to be projected. The image illustrated in FIG. 16 is conceptual, and does not accurately indicate the size, shape, orientation, position, and the like. In the present example embodiment, since the projection light 405 is projected using curved surface mirror 46, a mirror image (image 465) of a target image 475 is formed on the reflecting surface 460 of the curved surface mirror 46. The image 465 is set to be formed according to the enlargement direction/enlargement ratio of the image by the curved surface mirror 46. In FIG. 16, the enlargement direction/enlargement ratio of the image is not accurately illustrated.

In the first modulation region 431, a phase image related to a first image 435 in the right range of the mirror image (image 465) of the target image 475 is set. Although FIG. 16 illustrates the first image 435, a phase image for forming the first image 435 is actually set in the first modulation region 431. When the first modulation region 431 in which the phase image for forming the first image 435 is set is irradiated with the light 402, the modulated light 403-1 (broken line) for forming the first image 435 is emitted toward the first shield 45-1. The modulated light 403-1 before passing through the first shield 45-1 forms an image 441 including an unnecessary light component. The first shield 45-1 shields the unnecessary light component included in the modulated light 403-1. In other words, the first shield 45-1 shields the unnecessary region (left side) included in the image 441 displayed by the modulated light 403-1 modulated in the first modulation region 431. The modulated light 403-1 that has passed through the first shield 45-1 does not include unnecessary light components such as 0th-order light and a ghost image. Therefore, the modulated light 403-1 after passing through the first shield 45-1 forms an image 451 that does not include an unnecessary light component.

In the second modulation region 432, a phase image related to a second image 436 in the left range of the mirror image (image 465) of the target image 475 is set. Although FIG. 16 illustrates the second image 436, a phase image for forming second image 436 is actually set in the second modulation region 432. When the second modulation region 432 in which the phase image for forming the second image 436 is set is irradiated with the light 402, the modulated light 403-2 (alternate long and short dash line) for forming the second image 436 is emitted toward the second shield 45-2. The modulated light 403-2 before passing through the second shield 45-2 forms an image 442 including an unnecessary light component. The second shield 45-2 shields the unnecessary light component included in the modulated light 403-2. In other words, the second shield 45-2 shields the unnecessary region (right side) included in the image 442 displayed by the modulated light 403-2 modulated in the second modulation region 432. The modulated light 403-2 that has passed through the second shield 45-2 does not include unnecessary light components such as 0th-order light and a ghost image. Therefore, the modulated light 403-2 after passing through the second shield 45-2 forms an image 452 that does not include an unnecessary light component.

The modulated light 403 having passed through the shield 45 travels toward the curved surface mirror 46. The modulated light 403 that has passed through the shield 45 includes a light component modulated in the first modulation region 431 and a light component modulated in the second modulation region 432. A mirror image (image 465) of the target image 475 that does not include unnecessary light components such as 0th-order light and a ghost image is formed on the reflecting surface 460 of the curved surface mirror 46.

The curved surface mirror 46 is a reflecting mirror having the curved reflecting surface 460. The reflecting surface 460 of the curved surface mirror 46 has a curvature related to the projection angle of the projection light 405. In the example of FIG. 13, the reflecting surface 460 of the curved surface mirror 46 has a shape of a side face of a cylinder. For example, the reflecting surface 460 of the curved surface mirror 46 may be a spherical surface. For example, the reflecting surface 460 of the curved surface mirror 46 may be a free-curved surface. For example, the reflecting surface 460 of the curved surface mirror 46 may have a shape in which a plurality of curved surfaces is combined instead of a single curved surface. For example, the reflecting surface 460 of the curved surface mirror 46 may have a shape in which a curved surface and a flat surface are combined.

The curved surface mirror 46 is disposed on an optical path of the modulated light 403 with the reflecting surface 460 facing the modulation part 430 of the spatial light modulator 43. The reflecting surface 460 of the curved surface mirror 46 is irradiated with the modulated light 403 modulated by the modulation part 430 of the spatial light modulator 43 and not shielded by the shield 45. The light (projection light 405) reflected by the reflecting surface 460 of the curved surface mirror 46 is enlarged at an enlargement ratio related to the curvature of the reflecting surface 460. The projection device 40 projects the projection light 405 enlarged according to the curvature of the reflecting surface 460. The modulated light 403 reflected by the reflecting surface 460 of the curved surface mirror 46 is enlarged in the direction perpendicular to the horizontal plane (the vertical direction in the sheet of FIG. 13), and is projected from the projection device 40 as the projection light 405. The projection light 405 is enlarged along the direction perpendicular to the horizontal plane (the vertical direction in the sheet of FIG. 13) according to the curvature of the range of irradiation with the modulated light 403 on the reflecting surface 460 of the curved surface mirror 46. For example, in order to increase the projection angle, the curvature of the reflecting surface 460 of the curved surface mirror 46 may be decreased. On the other hand, in order to reduce the projection angle, the curvature of the reflecting surface 460 of the curved surface mirror 46 may be increased. The projection light 405 displays the target image 475 including the desired image (A) included in the image region of the image 441 and the desired image (B) included in the image region of the image 442 on the face to be projected. That is, the projection light 405 displays the target image 475 in which the image 451 and the image 452 including the desired image (A, B) are combined on the face to be projected.

Figure 17:
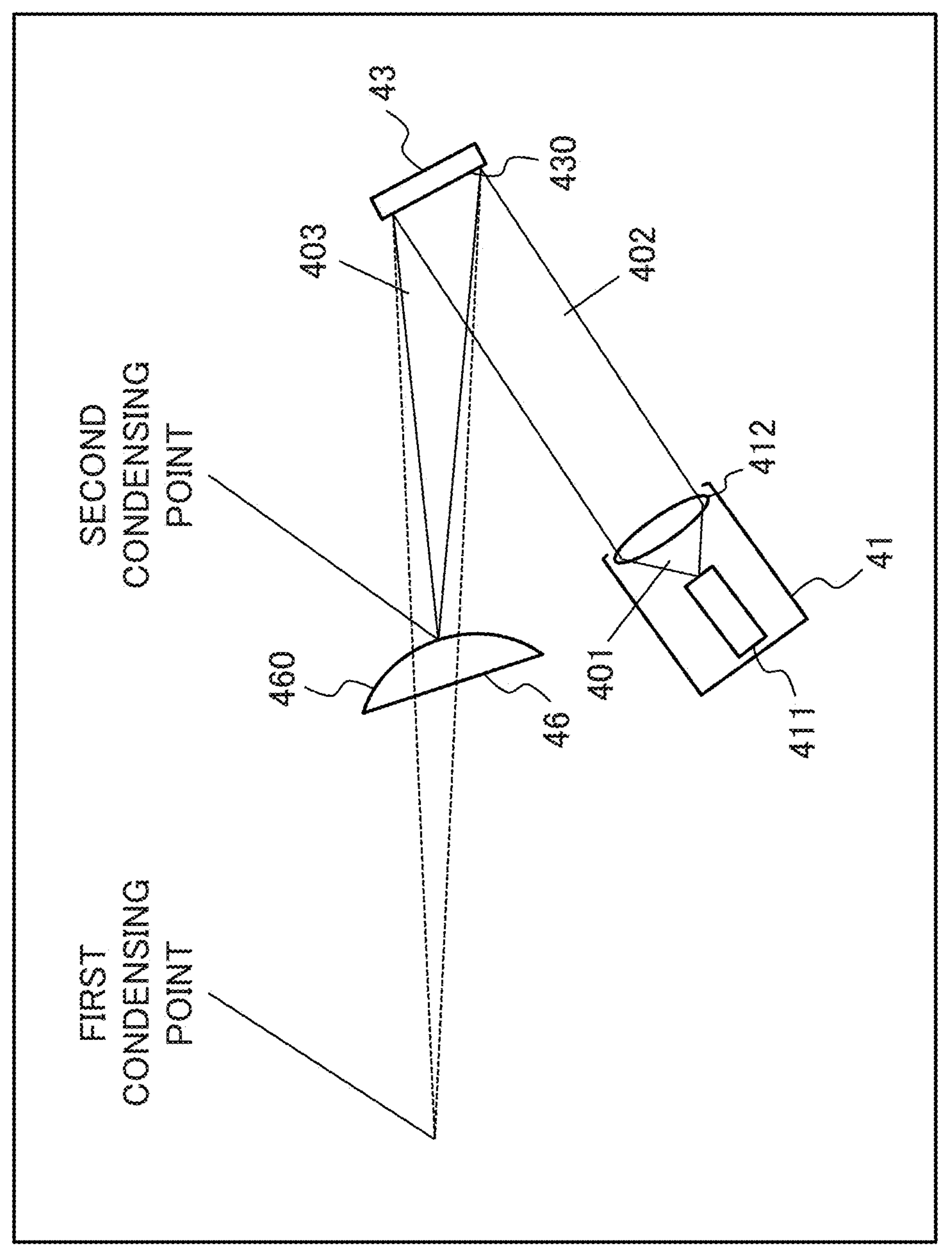
FIG. 17 is a conceptual diagram illustrating an example of a condensing point of light emitted from a light source of a projection device according to the fourth example embodiment.

FIG. 17 is a conceptual diagram for describing an example of a positional relationship between a condensing point (first condensing point) at which the 0th-order light is condensed by the virtual lens image 4320 and a condensing point (second condensing point) at which the modulated light 403 is condensed by the virtual lens image 4320. In the example of FIG. 17, the first condensing point is set at the position behind the curved surface mirror 46. For example, the 0th-order light is configured to be shielded by the shield 45. The second condensing point is set on the reflecting surface 460 of the curved surface mirror 46. The image 465 formed by the virtual lens image 4320 is formed on the reflecting surface 460 of the curved surface mirror 46. The projection device 40 projects the modulated light 403 reflected by the reflecting surface 460 of the curved surface mirror 46 as the projection light 405. In the case of the configuration of FIG. 17, the 0th-order light that cannot be shielded by the shield 45 is projected. The 0th-order light is diffused after being reflected by the reflecting surface 460 of the curved surface mirror 46 and then focused.

Figure 18:
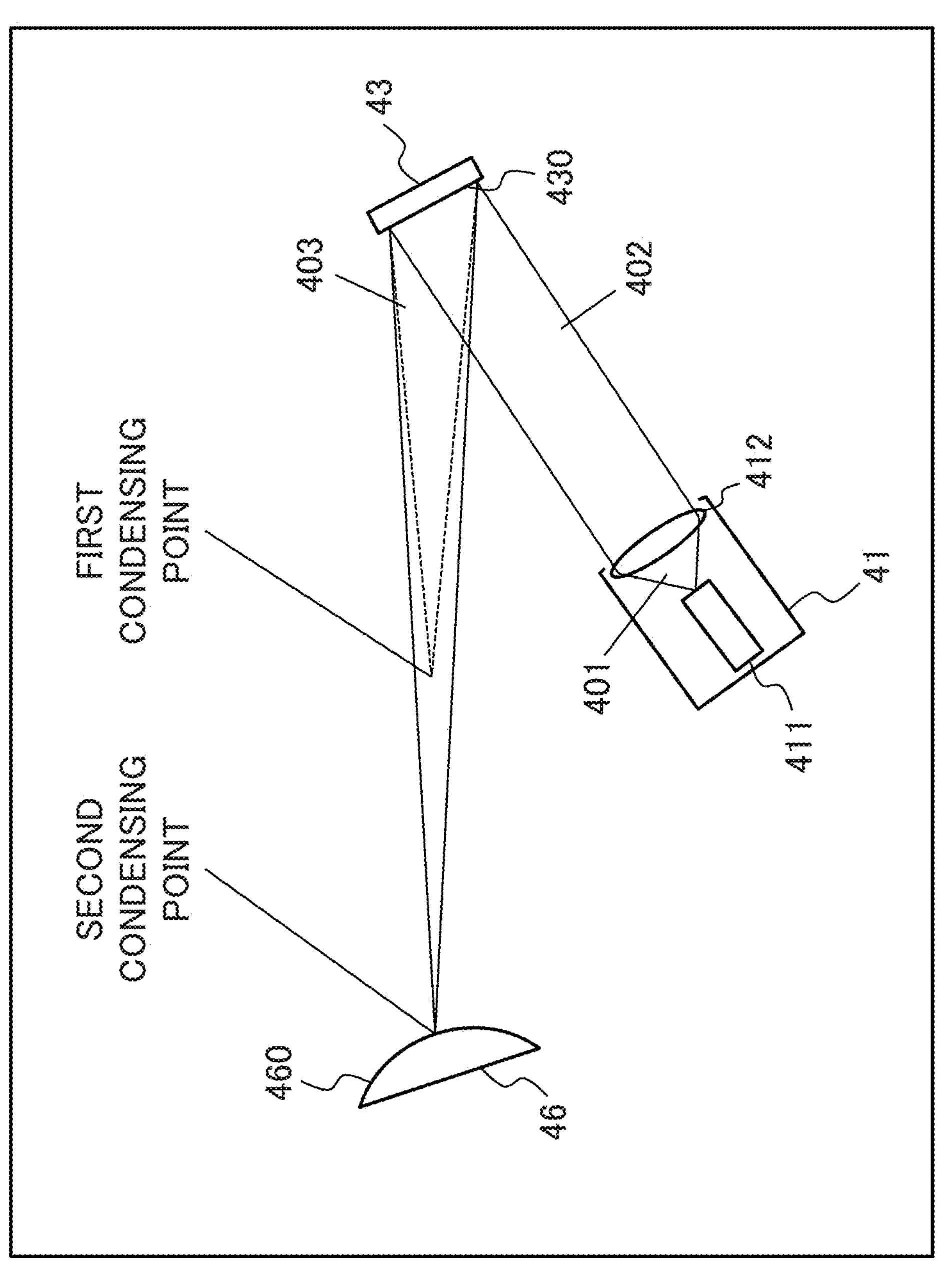
FIG. 18 is a conceptual diagram illustrating another example of a condensing point of light emitted from a light source of a projection device according to the fourth example embodiment.

FIG. 18 is a conceptual diagram for describing another example of the positional relationship between the first condensing point where the 0th-order light is condensed and the second condensing point where the modulated light 403 is condensed by the virtual lens image 4320. In the example of FIG. 18, the first condensing point is set at a position between the spatial light modulator 43 and the curved surface mirror 46. For example, the 0th-order light is configured to be shielded by the shield 45. For example, a 0th-order light remover (not illustrated) that shields the 0th-order light may be disposed at the position of the first condensing point between the spatial light modulator 43 and the curved surface mirror 46. The second condensing point is set on the reflecting surface 460 of the curved surface mirror 46. The image 465 formed by the virtual lens image 4320 is formed on the reflecting surface 460 of the curved surface mirror 46. The projection device 40 projects the modulated light 403 reflected by the reflecting surface 460 of the curved surface mirror 46 as the projection light 405. In the case of the configuration of FIG. 18, the 0th-order light is shielded by the shield 45. Therefore, in the configuration of FIG. 18, since the 0th-order light is not mixed with projection light 405, the contrast is improved as compared with the configuration of FIG. 17.

As in the examples of FIGS. 17 and 18, when the first condensing point and the second condensing point are set at different positions, the 0th-order light is defocused at the second condensing point. Therefore, the 0th-order light can be made inconspicuous to some extent without using the shield 45.

The control unit 47 has a configuration similar to that of the control unit 17 of the first example embodiment. The control unit 47 controls the light source 41 and the spatial light modulator 43. The control unit 47 sets a phase image related to the image to be projected in each of the first modulation region 431 and the second modulation region 432 in accordance with the aspect ratio of the tiling set in the modulation part 430 of the spatial light modulator 43.

In a state where the phase image related to the mirror image of the target image displayed on the face to be projected is set in each of the first modulation region 431 and the second modulation region 432 of the modulation part 430, the control unit 47 drives the emitter 411 of the light source 41. As a result, the modulation part 430 of the spatial light modulator 43 is irradiated with the light 402 emitted from the light source 41 in accordance with the timing at which the phase image is set in the modulation part 430 of the spatial light modulator 43. The light 402 with which the modulation part 430 of the spatial light modulator 43 is irradiated is modulated in each of the first modulation region 431 and the second modulation region 432 of the modulation part 430 of the spatial light modulator 43. The modulated light 403 modulated in each of the first modulation region 431 and the second modulation region 432 of the modulation part 430 of the spatial light modulator 43 travels toward the shield 45.

As described above, the projection device according to the present example embodiment includes the light source, the spatial light modulator, the shield, the curved surface mirror, and the control unit. The light source emits light. The spatial light modulator includes the modulation part which is irradiated with light emitted from the light source. In the spatial light modulator, the phase of the light with which the modulation part is irradiated is modulated by the modulation part. The control unit allocates at least two modulation regions to the modulation part of the spatial light modulator. The control unit sets phase images of at least two images constituting the target image in the face to be projected in at least two respective modulation regions. The control unit controls the light source in such a way that the modulation part in which the phase image of each of the at least two images is set is irradiated with light. The shield is disposed on the optical path of the modulated light modulated by the modulation part of the spatial light modulator. The shield transmits, of modulated light modulated in each of at least two modulation regions set in the modulation part of the spatial light modulator, a light component of an image region where a desired image is formed as projection light. The shield shields a light component of an unnecessary region including a ghost image of a desired image. For example, the shield is disposed at a position at which 0th-order light included in modulated light modulated in each of at least two modulation regions is shielded. The curved surface mirror has a curved reflecting surface irradiated with the modulated light modulated by the modulation part of the spatial light modulator. The curved surface mirror is disposed on an optical path of a light component of an image region for forming a desired image that has passed through the shield, of modulated light modulated by the modulation part of the spatial light modulator. The curved surface mirror reflects the light component of the image region on the reflecting surface, and projects projection light with an enlarged projection angle according to the curvature of the reflecting surface.

The control unit allocates a first modulation region and a second modulation region to the modulation part of the spatial light modulator. The control unit sets phase images of the first image and the second image constituting the target image in the first modulation region and the second modulation region, respectively. The shield is disposed at a position at which a light component of the unnecessary region included in modulated light modulated in each of the first modulation region and the second modulation region is shielded.

The projection device according to the present example embodiment displays, on the face to be projected, a target image including the first image formed by a phase distribution set in the first modulation region and the second image formed by a phase distribution set in the second modulation region. The projection device of the present example embodiment does not include a Fourier transform lens or a projection lens, but can enlarge and project projection light with a curved surface mirror. That is, the projection device of the present example embodiment can enlarge and project projection light for displaying an image including no ghost image without using the projection optical system.

In an aspect of the present example embodiment, the control unit sets, in the first modulation region, a composite image obtained by combining a phase image of a first image constituting a target image and a virtual lens image for condensing modulated light for forming the first image at a position of a reflecting surface of a curved surface mirror. The control unit sets, in the second modulation region, a composite image obtained by combining the phase image of the second image constituting the target image and the virtual lens image condensing the modulated light forming the second image at a position of the reflecting surface of the curved surface mirror. According to the present aspect, by condensing the modulated light at the position of the reflecting surface of the curved surface mirror using the virtual lens image, projection light for clearly displaying an image including no ghost image on the face to be projected can be projected.

Fifth Example Embodiment

Next, a projection device according to a fifth example embodiment will be described with reference to the drawings. A projection device of the present example embodiment is different from that of the first example embodiment in that two light sources are included in order to trim a non-displayable region of a target image displayed on a face to be projected. The projection device of the present example embodiment may be combined with the configurations of the projection devices of the second to fourth example embodiments.

(Configuration)

Figure 19:
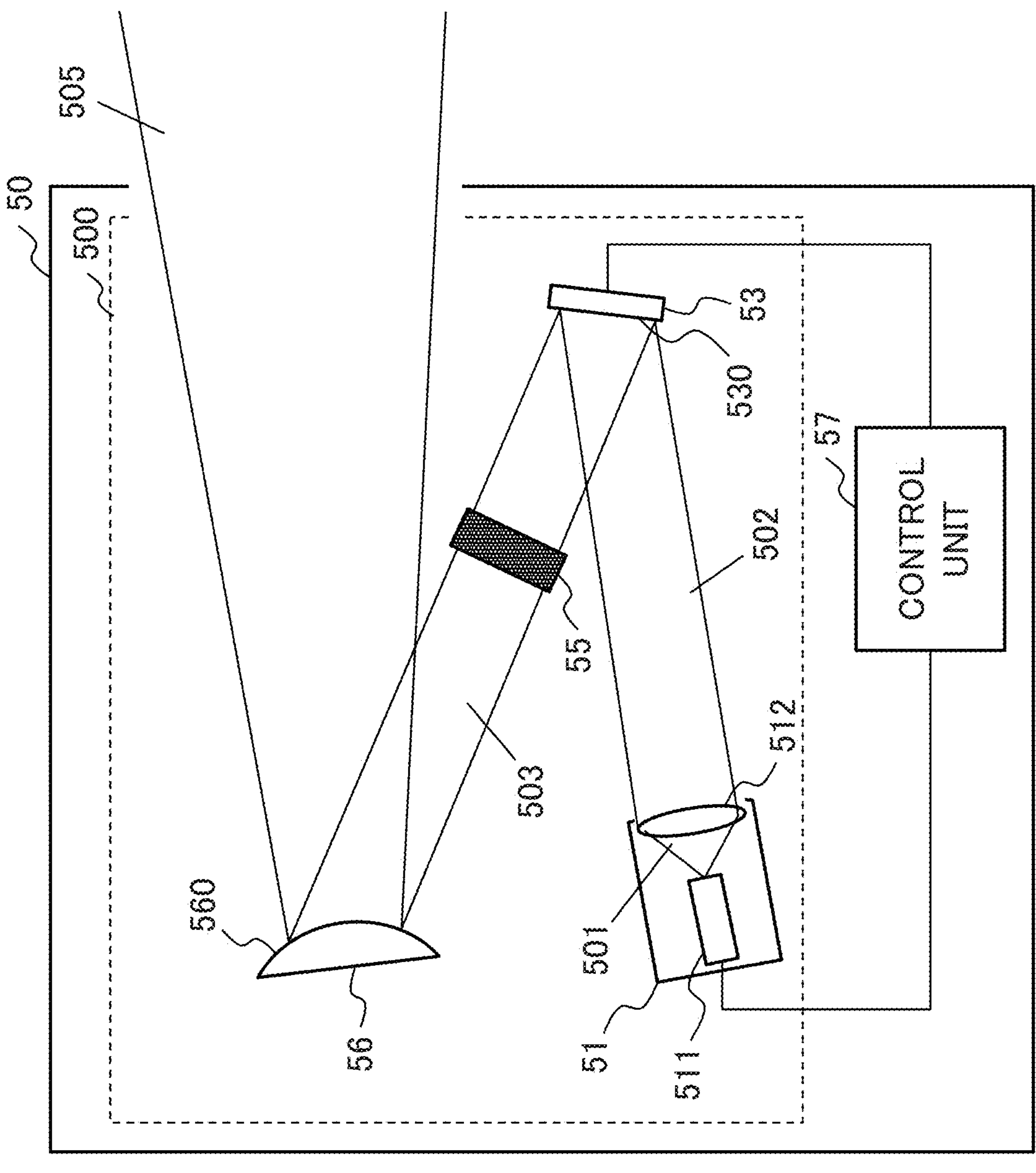
FIG. 19 is a conceptual diagram illustrating an example of a configuration of a projection device according to a fifth example embodiment.

FIG. 19 is a conceptual diagram illustrating an example of a configuration of a projection device 50 of the present example embodiment. The projection device 50 includes a light source 51, a spatial light modulator 53, a shield 55, a curved surface mirror 56, and a control unit 57. The light source 51, the spatial light modulator 53, the curved surface mirror 56, and the shield 55 constitute a projection unit 500. FIG. 19 is a side view of the internal configuration of the projection device 50 when viewed from the side. FIG. 19 is conceptual, and does not accurately represent the positional relationship between the components, the traveling direction of light, and the like.

Figure 20:
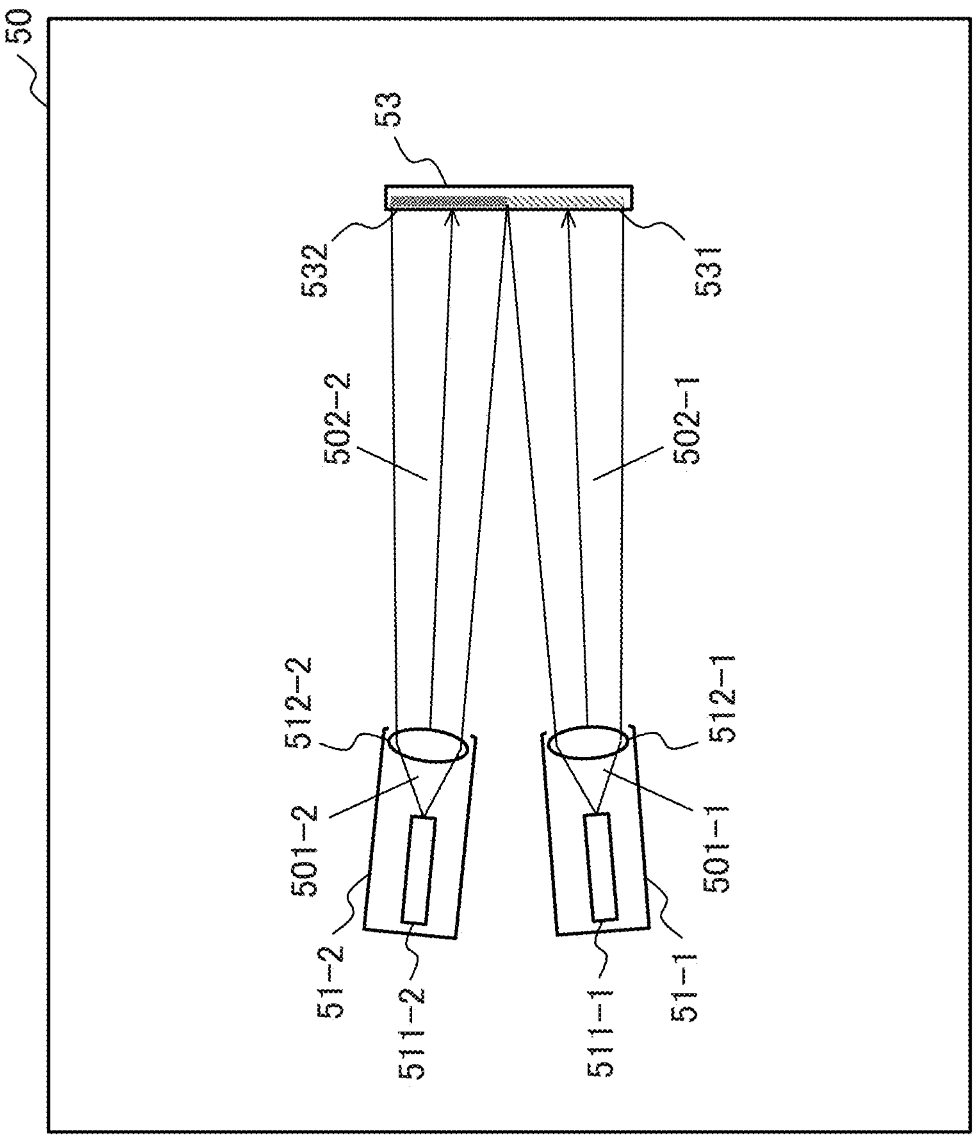
FIG. 20 is a conceptual diagram illustrating an example of a positional relationship between a light source and a spatial light modulator of a projection device according to the fifth example embodiment.

FIG. 20 is a conceptual diagram illustrating an example of a positional relationship between the light source 51 and the spatial light modulator 53. The light source 51 includes a first light source 51-1 and a second light source 51-2. Each of the first light source 51-1 and the second light source 51-2 has a configuration similar to that of the light source 11 of the first example embodiment.

The first light source 51-1 includes an emitter 511-1 and a lens 512-1. The emitter 511-1 emits laser light 501-1 in a predetermined wavelength band under the control of control unit 57. The lens 512-1 enlarges the laser light 501-1 emitted from the emitter 511-1 according to the size of a first modulation region 531 of the modulation part 530 of the spatial light modulator 53. The laser light 501-1 emitted from the emitter 511-1 is enlarged by the lens 512-1 and emitted from the first light source 51-1. Light 502-1 emitted from the first light source 51-1 travels toward a first modulation region 531 of a modulation part 530 of the spatial light modulator 53.

The second light source 51-2 includes an emitter 511-2 and a lens 512-2. The emitter 511-2 emits laser light 501-2 in a predetermined wavelength band under the control of control unit 57. The lens 512-2 enlarges the laser light 501-2 emitted from the emitter 511-2 according to the size of a second modulation region 532 of the modulation part 530 of the spatial light modulator 53. The laser light 501-2 emitted from the emitter 511-2 is enlarged by the lens 512-2 and emitted from the second light source 51-2. The light 502-1 emitted from the second light source 51-2 travels toward the second modulation region 532 of the modulation part 530 of the spatial light modulator 53.

The first light source 51-1 and the second light source 51-2 are disposed in such a way that a trimming region to be described later is deleted. The first light source 51-1 and the second light source 51-2 are disposed in such a way that part of modulated light modulated in the first modulation region 531 and part of modulated light modulated in the second modulation region 532 of the modulation part 530 of the spatial light modulator 53 overlap with each other on a reflecting surface 560 of the curved surface mirror 56. That is, the radiation angles of the first light source 51-1 and the second light source 51-2 are adjusted in such a way that part of the modulated light 503 modulated in the first modulation region 531 and part of the modulated light 503 modulated in the second modulation region 532 overlap with each other on the reflecting surface 560 of the curved surface mirror 56.

The spatial light modulator 53 has a configuration similar to that of the spatial light modulator 13 of the first example embodiment. The spatial light modulator 53 includes a modulation part 530 irradiated with the light 502-1 emitted from the first light source 51-1 and the light 502-2 emitted from the second light source 51-2. Region division of the modulation part 530 of the spatial light modulator 53 is similar to that of the first example embodiment. The modulation part 530 of the spatial light modulator 53 is irradiated with the light 502-1 emitted from the first light source 51-1 and the light 502-2 emitted from the second light source 51-2. In the modulation part 530 of the spatial light modulator 53, a pattern related to the image displayed by projection light 505 is set according to the control of the control unit 57. As in the fourth example embodiment, the pattern set in the modulation part 530 of the spatial light modulator 53 is a composite image. The composite image is a pattern obtained by combining the phase image and the virtual lens image. The phase image is a pattern for forming a desired image. The virtual lens image is a pattern for condensing light for forming a desired image. The light 502-1 to 2 incident on the modulation part 530 of the spatial light modulator 53 is modulated according to the pattern set in the modulation part 530 of the spatial light modulator 53. Modulated light 503 modulated by the modulation part 530 of the spatial light modulator 53 travels toward the shield 55. Modulated light 503 includes modulated light 503-1 modulated in the first modulation region 531 and modulated light 503-2 modulated in the second modulation region 532.

Figure 21:
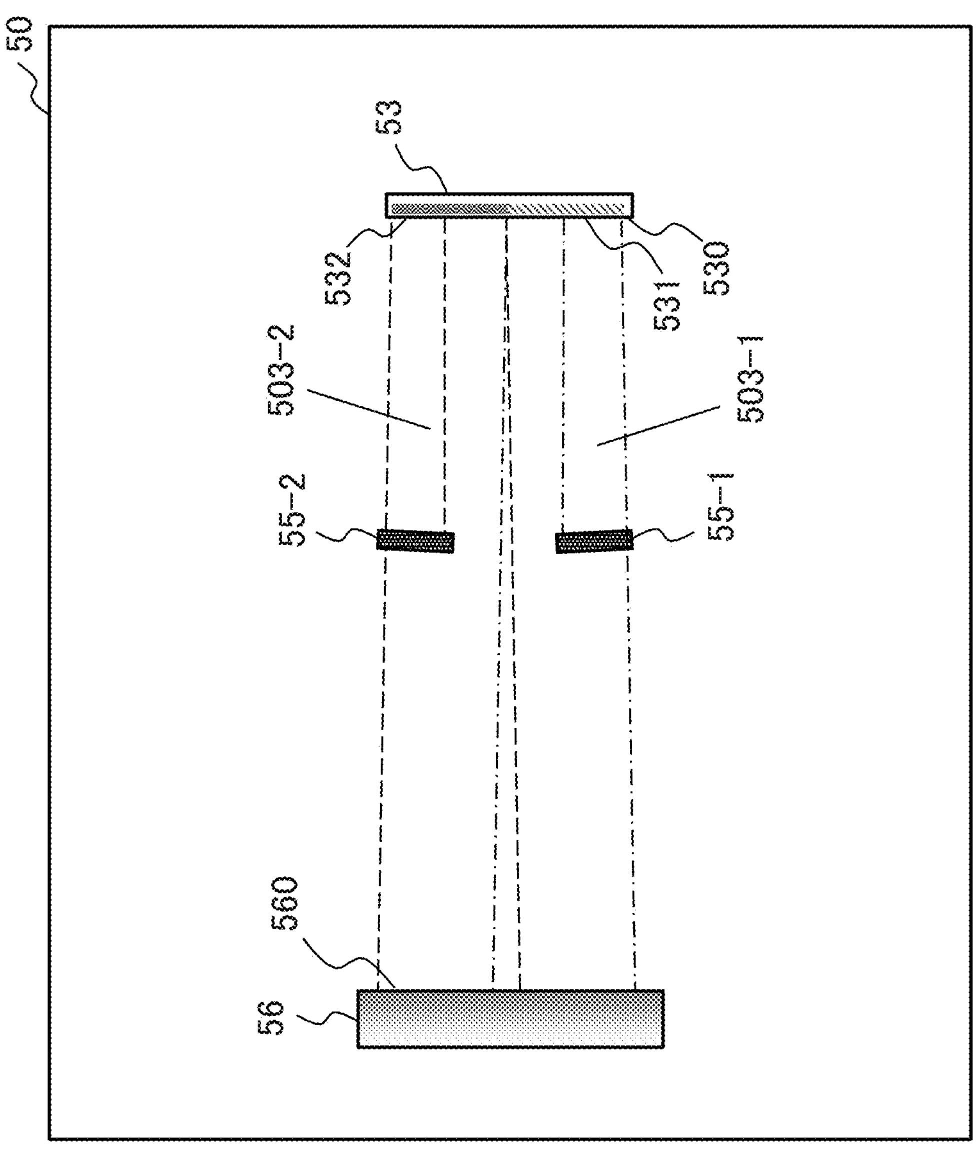
FIG. 21 is a conceptual diagram illustrating a state in which modulated light modulated by a modulation part of the spatial light modulator of the projection device according to the fifth example embodiment travels toward a curved surface mirror.

FIG. 21 is a conceptual diagram illustrating a state in which modulated light 503 modulated by the modulation part 530 of the spatial light modulator 53 travels toward the curved surface mirror 56. FIG. 21 is a side view of the internal configuration of the projection device 50 when viewed from above. In FIG. 21, the light source 51 is omitted. FIG. 21 is conceptual, and does not accurately represent the positional relationship between the components, the traveling direction of light, and the like. The first modulation region 531 and the second modulation region 532 are set in the modulation part 530 of the spatial light modulator 53. A phase image related to an image (also referred to as a first image) in the right range of the mirror image of the target image is set in the first modulation region 531. A phase image related to an image (also referred to as a second image) in the left range of the mirror image of the target image is set in the second modulation region 532. Each of the first image and the second image includes at least one image (also referred to as a desired image).

The shield 55 has a configuration similar to that of the shield 15 of the first example embodiment. The shield 55 includes a first shield 55-1 and a second shield 55-2. The first shield 55-1 is disposed on an optical path of the modulated light 503-1 modulated in the first modulation region 531. The first shield 55-1 is disposed is disposed at a position at which an unnecessary region of the first image 535 is shielded. The second shield 55-2 is disposed on an optical path of the modulated light 503-2 modulated in the second modulation region 532. The second shield 55-2 is disposed at a position at which an unnecessary region of the second image 536 is shielded.

Figure 22:
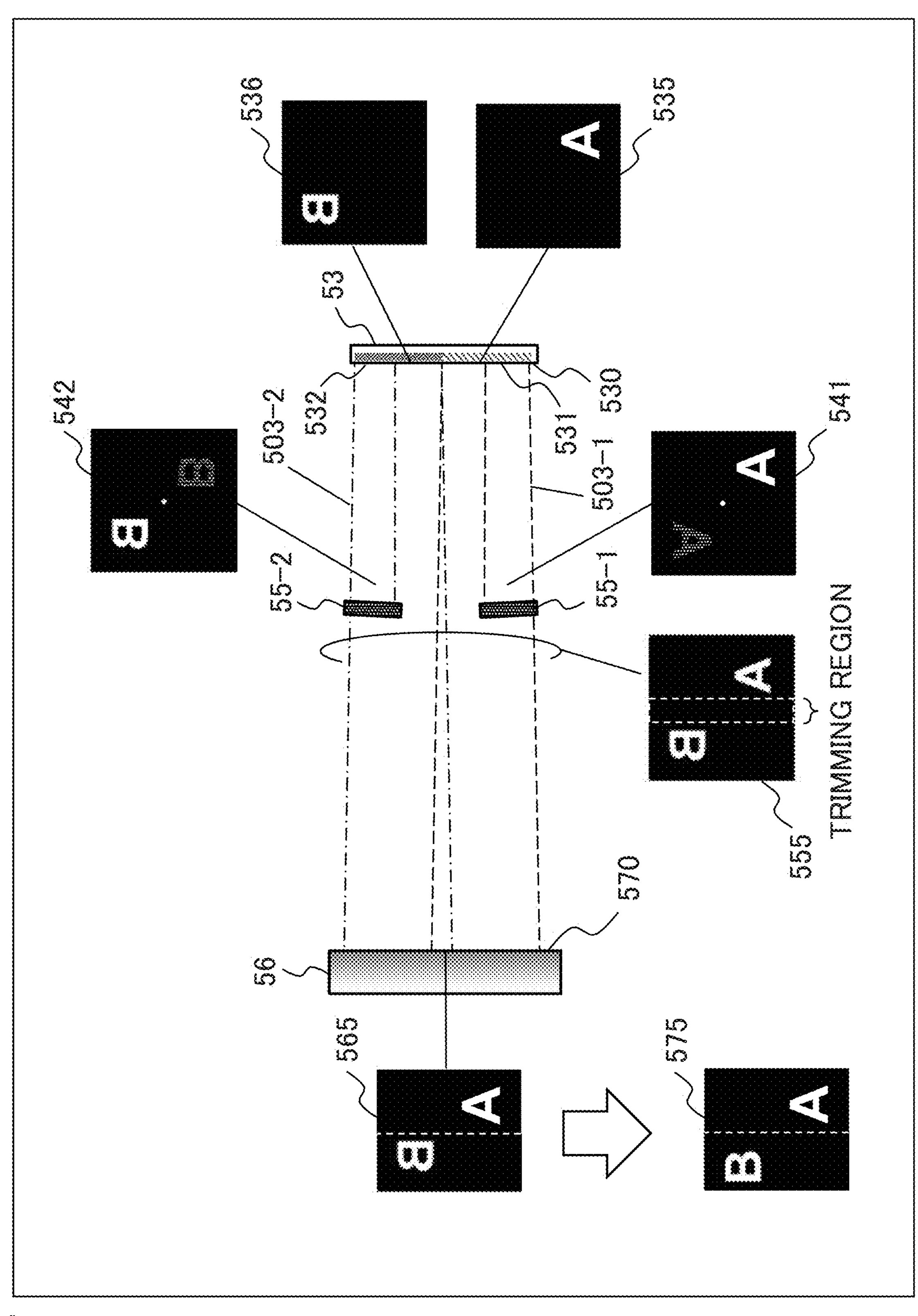
FIG. 22 is a conceptual diagram for describing shielding of unnecessary light components by the shield of the projection device according to the fifth example embodiment.

FIG. 22 is a conceptual diagram for describing an example in which an unnecessary region (also referred to as a trimming region) is trimmed from an image in which an unnecessary light component is shielded by the shield 55. FIG. 22 illustrates an example of an image related to the phase image set in the modulation part 530 of the spatial light modulator 53, an image formed by light before and after the shield 55, and a target image displayed on the face to be projected. The image illustrated in FIG. 22 is conceptual, and does not accurately indicate the size, shape, orientation, position, and the like. In the present example embodiment, since the projection light 505 is projected using the curved surface mirror 56, a mirror image (image 565) of a target image 575 is formed on the reflecting surface 560 of the curved surface mirror 56. The image 565 is set to be formed according to the enlargement direction/enlargement ratio of the image by the curved surface mirror 56. In FIG. 22, the enlargement direction/enlargement ratio of the image is not accurately illustrated.

In the first modulation region 531, a phase image related to a first image 535 in the right range of the mirror image (image 565) of the target image 575 is set. Although FIG. 22 illustrates the first image 535, a phase image for forming the first image 535 is actually set in the first modulation region 531. When the first modulation region 531 in which the phase image for forming the first image 535 is set is irradiated with light 502, the modulated light 503-1 (broken line) for forming the first image 535 is emitted toward the first shield 55-1. The modulated light 503-1 before passing through the first shield 55-1 forms an image 541 including an unnecessary light component. The first shield 55-1 shields the unnecessary light component included in the modulated light 503-1. In other words, the first shield 55-1 shields the unnecessary region (left side) included in an image 541 displayed by the modulated light 503-1 modulated in the first modulation region 531. The modulated light 503-1 that has passed through the first shield 55-1 does not include unnecessary light components such as 0th-order light and a ghost image. Therefore, the modulated light 503-1 after passing through the first shield 55-1 forms an image that does not include an unnecessary light component.

In the second modulation region 532, a phase image related to a second image 536 in the left range of the mirror image (image 565) of the target image 575 is set. Although FIG. 22 illustrates the second image 536, a phase image for forming second image 536 is actually set in the second modulation region 532. When the second modulation region 532 in which the phase image for forming the second image 536 is set is irradiated with the light 502, the modulated light 503-2 (alternate long and short dash line) for forming the second image 536 is emitted toward the second shield 55-2. The modulated light 503-2 before passing through the second shield 55-2 forms an image 542 including an unnecessary light component. The second shield 55-2 shields the unnecessary light component included in the modulated light 503-2. In other words, the second shield 55-2 shields the unnecessary region (right side) included in the image 542 displayed by the modulated light 503-2 modulated in the second modulation region 532. The modulated light 503-2 that has passed through the second shield 55-2 does not include unnecessary light components such as 0th-order light and a ghost image. Therefore, the modulated light 503-2 after passing through the second shield 55-2 forms an image that does not include an unnecessary light component.

The modulated light 503 having passed through the shield 55 travels toward the curved surface mirror 56. The modulated light 503 that has passed through the shield 55 includes a light component modulated in the first modulation region 531 and a light component modulated in the second modulation region 532. An image 555 formed by the modulated light 503 immediately after passing through the shield 55 includes a trimming region. A mirror image (image 565) of a target image that does not include unnecessary light components such as 0th-order light and a ghost image is formed on the reflecting surface 560 of the curved surface mirror 56. Part of the range of irradiation with the modulated light 503-1 modulated in first modulation region 531 and part of the range of irradiation with modulated light 503-2 modulated in second modulation region 532 overlap with each other on reflecting surface 560 of the curved surface mirror 56. When the irradiation ranges overlap with each other, the trimming region is removed.

The curved surface mirror 56 has a configuration similar to that of curved surface mirror 46 of the fourth example embodiment. The curved surface mirror 56 is a reflecting mirror having the curved reflecting surface 560. The reflecting surface 560 of the curved surface mirror 56 has a curvature related to the projection angle of the projection light 505.

The curved surface mirror 56 is disposed on an optical path of the modulated light 503 with the reflecting surface 560 facing the modulation part 530 of the spatial light modulator 53. The reflecting surface 560 of the curved surface mirror 56 is irradiated with the modulated light 503 modulated by the modulation part 530 of the spatial light modulator 53 and not shielded by the shield 55. The light (projection light 505) reflected by the reflecting surface 560 of the curved surface mirror 56 is enlarged at an enlargement ratio related to the curvature of the reflecting surface 560. The projection device 50 projects the projection light 505 whose enlargement ratio is increased according to the curvature of the reflecting surface 560. The modulated light 503 reflected by the reflecting surface 560 of the curved surface mirror 56 is projected as the projection light 505 enlarged in the direction perpendicular to the horizontal plane (the vertical direction in the sheet of FIG. 19). The projection light 505 is enlarged along the direction perpendicular to the horizontal plane (the vertical direction in the sheet of FIG. 19) according to the curvature of the range of irradiation with the modulated light 503 on the reflecting surface 560 of the curved surface mirror 56. For example, in order to increase the projection angle, the curvature of the reflecting surface 560 of the curved surface mirror 56 may be decreased. On the other hand, in order to reduce the projection angle, the curvature of the reflecting surface 560 of the curved surface mirror 56 may be increased. The projection light 505 displays the target image 575 including the desired image (A) included in the image region of the image 541 and the desired image (B) included in the image region of the image 542 on the face to be projected. That is, the projection light 505 displays the target image 575 in which the desired images (A, B) are combined on the face to be projected. A trimming region of the image 555 in FIG. 22 is removed from the target image 575 displayed on the face to be projected.

The control unit 57 has a configuration similar to that of the control unit 17 of the first example embodiment. The control unit 57 controls the light source 51 and the spatial light modulator 53. The control unit 57 sets a phase image related to the image to be projected in each of the first modulation region 531 and the second modulation region 532 in accordance with the aspect ratio of the tiling set in the modulation part 530 of the spatial light modulator 53.

In a state where the phase image related to the mirror image of the target image displayed on the face to be projected is set in each of the first modulation region 531 and the second modulation region 532 of the modulation part 530, the control unit 57 drives the emitter 511 of the light source 51. As a result, the modulation part 530 of the spatial light modulator 53 is irradiated with the light 502 emitted from the light source 51 in accordance with the timing at which the phase image is set in the modulation part 530 of the spatial light modulator 53. The light 502 with which the modulation part 530 of the spatial light modulator 53 is irradiated is modulated in each of the first modulation region 531 and the second modulation region 532 of the modulation part 530 of the spatial light modulator 53. The modulated light 503 modulated in each of the first modulation region 531 and the second modulation region 532 of the modulation part 530 of the spatial light modulator 53 travels toward the shield 55.

As described above, the projection device of the present example embodiment includes at least two light sources, the spatial light modulator, the shield, and the control unit. The at least two light sources emit light. In each of the at least two light sources, an emission angle of light emitted from each of the at least two light sources is set in such a way that regions to be trimmed included in the target image overlap with each other. The spatial light modulator includes the modulation part which is irradiated with light emitted from the light source. In the spatial light modulator, the phase of the light with which the modulation part is irradiated is modulated by the modulation part. The control unit allocates at least two modulation regions to the modulation part of the spatial light modulator. The control unit sets phase images of at least two images constituting the target image in the face to be projected in at least two respective modulation regions. The control unit controls the light source in such a way that the modulation part in which the phase image of each of the at least two images is set is irradiated with light. The shield is disposed on the optical path of the modulated light modulated by the modulation part of the spatial light modulator. The shield transmits, of modulated light modulated in each of at least two modulation regions set in the modulation part of the spatial light modulator, a light component of an image region where a desired image is formed as projection light. The shield shields a light component of an unnecessary region including a ghost image of a desired image.

The projection device of the present example embodiment sets the light emission angle of each of at least two light sources in such a way that regions to be trimmed included in a target image overlap with each other. Therefore, the projection device of the present example embodiment can display the image from which the trimming region has been deleted on the face to be projected.

Sixth Example Embodiment

Figure 23:
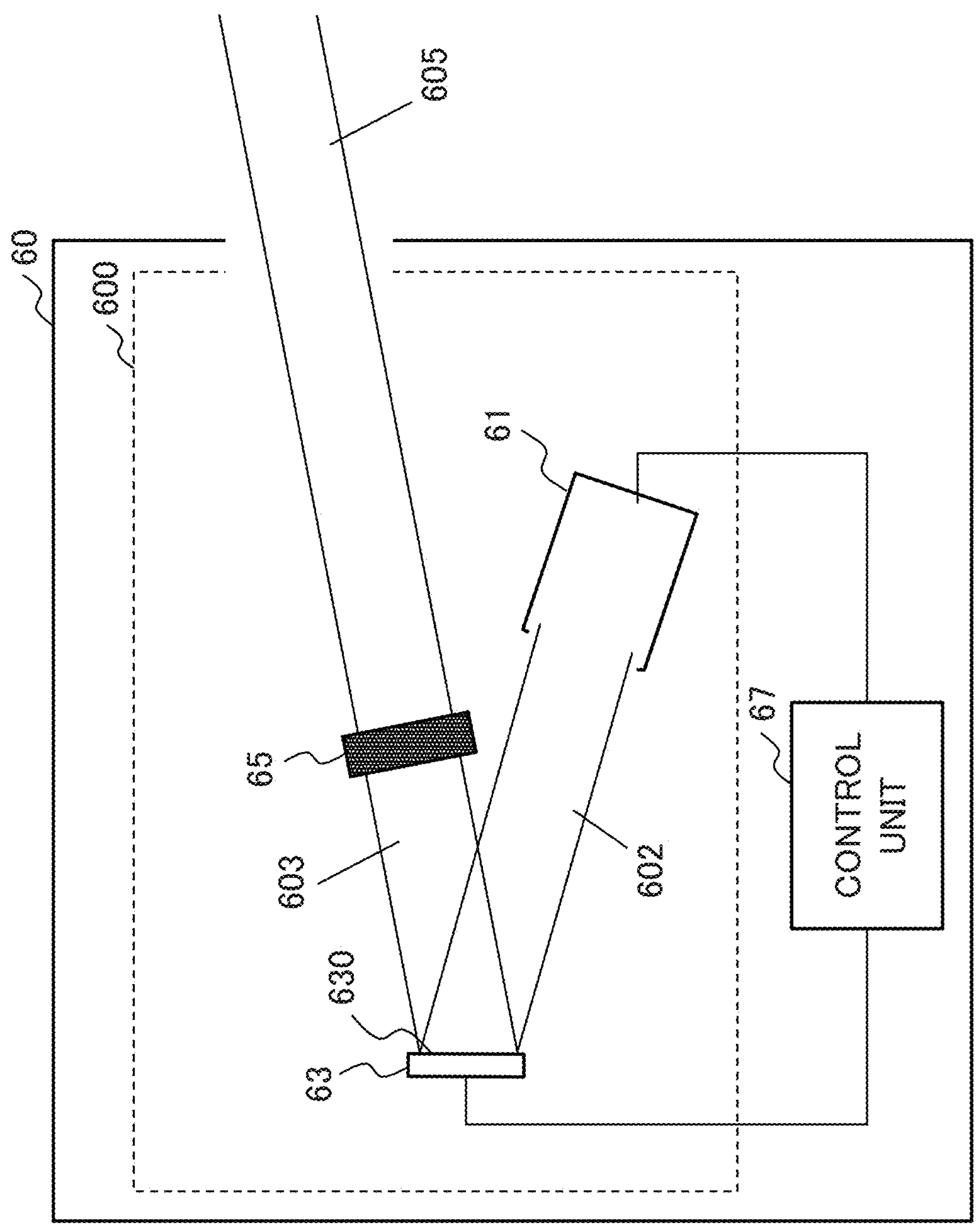
FIG. 23 is a conceptual diagram illustrating an example of a configuration of a projection device according to a sixth example embodiment.

Next, a projection device according to the sixth example embodiment will be described with reference to the drawings. The projection device of the present example embodiment has a configuration in which the projection devices of the first to fifth example embodiments are simplified. FIG. 23 is a conceptual diagram illustrating an example of a configuration of a projection device 60 of the present example embodiment. The projection device 60 includes a light source 61, a spatial light modulator 63, a shield 65, and a control unit 67.

The light source 61 emits light 602. The spatial light modulator 63 includes a modulation part 630 irradiated with the light 602 emitted from the light source 61. In the spatial light modulator 63, the phase of the light 602 with which the modulation part 630 is irradiated is modulated by the modulation part 630. The control unit 67 allocates at least two modulation regions to the modulation part 630 of the spatial light modulator 63. The control unit 67 sets the phase images of at least two images constituting the target image on the face to be projected in at least two respective modulation regions. The control unit 67 controls the light source 61 in such a way that the modulation part 630 in which the phase image of each of the at least two images is set is irradiated with the light 602. The shield 65 is disposed on the optical path of modulated light 603 modulated by the modulation part 630 of the spatial light modulator 63. The shield 65 transmits, of the modulated light 603 modulated in each of at least two modulation regions set in the modulation part 630 of the spatial light modulator 63, a light component of an image region where a desired image is formed as projection light 605. The shield 65 shields a light component of an unnecessary region including a ghost image of a desired image.

The projection device of the present example embodiment does not include a Fourier transform lens or a projection lens. The projection device according to the present example embodiment shields a light component of an unnecessary region including a ghost image with a shield. That is, the projection device of the present example embodiment can project projection light for displaying an image including no ghost image without using the projection optical system.

(Hardware)

A hardware configuration for executing control and processing according to each example embodiment of the present disclosure will be described using an information processing device 90 of FIG. 24 as an example. The information processing device 90 in FIG. 24 is a configuration example for performing control and a process of each example embodiment, and does not limit the scope of the present disclosure.

Figure 24:
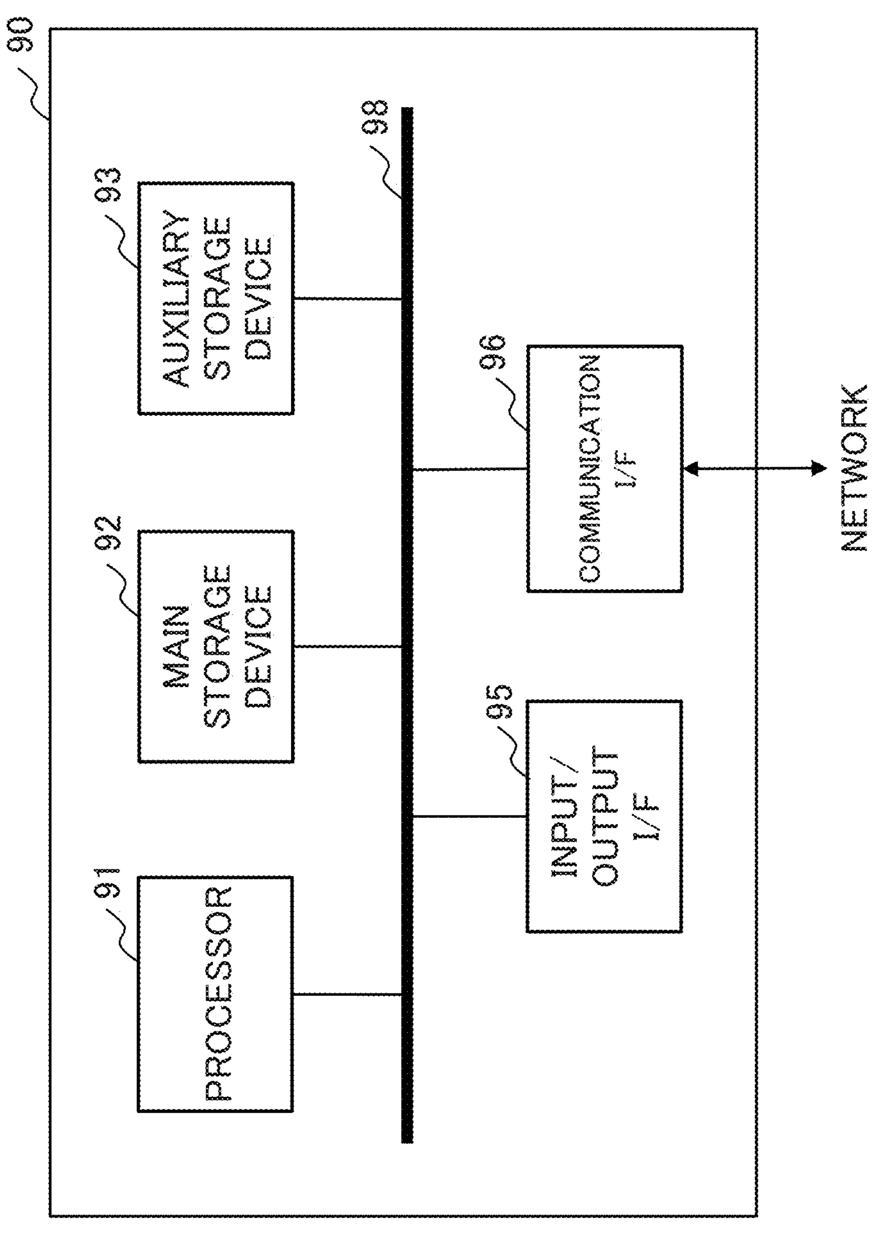
FIG. 24 is a block diagram illustrating an example of a hardware configuration that implements control and a process of each example embodiment.

As illustrated in FIG. 24, the information processing device 90 includes a processor 91, a main storage device 92, an auxiliary storage device 93, an input/output interface 95, and a communication interface 96. In FIG. 24, the interface is abbreviated as an interface (I/F). The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops the program stored in the auxiliary storage device 93 or the like in the main storage device 92. The processor 91 executes the program developed in the main storage device 92. In the present example embodiment, a software program installed in the information processing device 90 may be used. The processor 91 executes control and processing according to the present example embodiment.

The main storage device 92 has an area in which a program is developed. A program stored in the auxiliary storage device 93 or the like is developed in the main storage device 92 by the processor 91. The main storage device 92 is achieved by, for example, a volatile memory such as a dynamic random access memory (DRAM). A nonvolatile memory such as a magnetoresistive random access memory (MRAM) may be configured and added as the main storage device 92.

The auxiliary storage device 93 stores various pieces of data such as programs. The auxiliary storage device 93 is achieved by a local disk such as a hard disk or a flash memory. Various pieces of data may be stored in the main storage device 92, and the auxiliary storage device 93 may be omitted.

The input/output interface 95 is an interface that connects the information processing device 90 with a peripheral device based on a standard or a specification. The communication interface 96 is an interface that connects to an external system or a device through a network such as the Internet or an intranet in accordance with a standard or a specification. The input/output interface 95 and the communication interface 96 may be shared as an interface connected to an external device.

An input device such as a keyboard, a mouse, or a touch panel may be connected to the information processing device 90 as necessary. These input devices are used to input of information and settings. In a case where the touch panel is used as the input device, the display screen of the display device may also serve as the interface of the input device. Data communication between the processor 91 and the input device may be mediated by the input/output interface 95.

The information processing device 90 may be provided with a display device that displays information. In a case where a display device is provided, the information processing device 90 preferably includes a display control device (not illustrated) that controls display of the display device. The display device may be connected to the information processing device 90 via the input/output interface 95.

The information processing device 90 may be provided with a drive device. The drive device mediates reading of data and a program from the recording medium, writing of a processing result of the information processing device 90 to the recording medium, and the like between the processor 91 and the recording medium (program recording medium). The drive device may be connected to the information processing device 90 via the input/output interface 95.

The above is an example of a hardware configuration for enabling control and processing according to each example embodiment of the present invention. The hardware configuration of FIG. 24 is an example of a hardware configuration for executing control and processing according to each example embodiment, and does not limit the scope of the present invention. A program for causing a computer to execute control and processing according to each example embodiment is also included in the scope of the present invention. A program recording medium in which the program according to each example embodiment is recorded is also included in the scope of the present invention. The recording medium can be achieved by, for example, an optical recording medium such as a compact disc (CD) or a digital versatile disc (DVD). The recording medium may be achieved by a semiconductor recording medium such as a Universal Serial Bus (USB) memory or a secure digital (SD) card. The recording medium may be achieved by a magnetic recording medium such as a flexible disk, or another recording medium. In a case where the program executed by the processor is recorded in the recording medium, the recording medium corresponds to a program recording medium.

The components of each example embodiment may be combined in any manner. The components of each example embodiment may be achieved by software or may be achieved by a circuit.

While the present invention is described with reference to example embodiments thereof, the present invention is not limited to these example embodiments. Various modifications that can be understood by those of ordinary skill in the art can be made to the configuration and details of the present invention within the scope of the present invention.

Some or all of the above example embodiments may be described as the following Supplementary Notes, but are not limited to the following.

(Supplementary Note 1)

A projection device including a light source, a spatial light modulator that includes a modulation part that is irradiated with light emitted from the light source and that modulates a phase of the light with which the modulation part is irradiated, a control unit that allocates at least two modulation regions to the modulation part of the spatial light modulator, sets phase images of at least two images constituting a target image on a face to be projected in the at least two respective modulation regions, and controls the light source in such a way that the modulation part in which the phase images of the at least two images are set is irradiated with the light, and a shield that is disposed on an optical path of modulated light modulated by the modulation part of the spatial light modulator and that is configured to transmit a light component in an image region where a desired image is formed as projection light and shield a light component in an unnecessary region including a ghost image of the desired image of the modulated light modulated in each of the at least two modulation regions set in the modulation part of the spatial light modulator.

(Supplementary Note 2)

The projection device according to Supplementary Note 1, wherein the shield is disposed at a position at which 0th-order light included in the modulated light modulated in the at least two modulation regions is shielded.

(Supplementary Note 3)

The projection device according to Supplementary Note 1 or 2, wherein the control unit allocates a first modulation region and a second modulation region to the modulation part of the spatial light modulator, and sets phase images of a first image and a second image constituting the target image in the first modulation region and the second modulation region, respectively, and wherein the shield is disposed at a position at which a light component of the unnecessary region included in the modulated light modulated in each of the first modulation region and the second modulation region is shielded.

(Supplementary Note 4)

The projection device according to Supplementary Note 3, wherein the control unit allocates the first modulation region to a left half of the modulation part of the spatial light modulator, allocates the second modulation region to a right half of the modulation part of the spatial light modulator, sets a phase image of the first image corresponding to a left half of the target image in the first modulation region, and sets a phase image of the second image corresponding to a right half of the target image in the second modulation region, and wherein the shield includes a first shield disposed at a position at which a light component of the unnecessary region included in the modulated light modulated in the first modulation region is shielded, and a second shield disposed at a position at which a light component of the unnecessary region included in the modulated light modulated in the second modulation region is shielded.

(Supplementary Note 5)

The projection device according to Supplementary Note 3, wherein the control unit allocates the first modulation region to an upper half of the modulation part of the spatial light modulator, allocates the second modulation region to a lower half of the modulation part of the spatial light modulator, sets a phase image of the first image corresponding to a lower half of the target image in the first modulation region, and sets a phase image of the second image corresponding to an upper half of the target image in the second modulation region, and wherein the shield includes a first shield disposed at a position at which a light component of the unnecessary region included in the modulated light modulated in the first modulation region is shielded, and a second shield disposed at a position at which a light component of the unnecessary region included in the modulated light modulated in the second modulation region is shielded.

(Supplementary Note 6)

The projection device according to Supplementary Note 3, wherein the control unit allocates the first modulation region to a left half of the modulation part of the spatial light modulator, allocates the second modulation region to a right half of the modulation part of the spatial light modulator, sets a phase image of the first image corresponding to a right half of the target image in the first modulation region, and sets a phase image of the second image corresponding to a left half of the target image in the second modulation region, and wherein the shield is disposed at a position at which a light component of the unnecessary region included in the modulated light modulated in the first modulation region and a light component of the unnecessary region included in the modulated light modulated in the second modulation region are shielded.

(Supplementary Note 7)

The projection device according to Supplementary Note 3, wherein the control unit allocates the first modulation region to an upper half of the modulation part of the spatial light modulator, allocates the second modulation region to a lower half of the modulation part of the spatial light modulator, sets a phase image of the first image corresponding to an upper half of the target image in the first modulation region, and sets a phase image of the second image corresponding to a lower half of the target image in the second modulation region, and wherein the shield is disposed at a position at which a light component of the unnecessary region included in the modulated light modulated in the first modulation region and a light component of the unnecessary region included in the modulated light modulated in the second modulation region are shielded.

(Supplementary Note 8)

The projection device according to any one of Supplementary Notes 3 to 7, further including a curved surface mirror that includes a curved reflecting surface irradiated with the modulated light modulated by the modulation part of the spatial light modulator, is disposed on an optical path of a light component of the image region forming the desired image, the light component having passed through the shield, of the modulated light modulated by the modulation part of the spatial light modulator, reflects the light component of the image region by the reflecting surface, and projects the projection light having a projection angle enlarged according to a curvature of the reflecting surface.

(Supplementary Note 9)

The projection device according to Supplementary Note 8, wherein the control unit sets, in the first modulation region, a composite image obtained by combining a phase image of the first image constituting the target image and a virtual lens image condensing the modulated light forming the first image at a position of the reflecting surface of the curved surface mirror, and sets, in the second modulation region, a composite image obtained by combining a phase image of the second image forming the target image and the virtual lens image condensing the modulated light forming the second image at a position of the reflecting surface of the curved surface mirror.

(Supplementary Note 10)

The projection device according to any one of Supplementary Notes 1 to 9 comprising at least two light sources, wherein in each of the at least two light sources, an emission angle of light emitted from each of the at least two light sources is set in such a way that regions to be trimmed included in the target image overlap with each other.

(Supplementary Note 11)

A projection control method of controlling a projection device including a light source, a spatial light modulator that includes a modulation part that is irradiated with light emitted from the light source and that modulates a phase of the light with which the modulation part is irradiated, and a shield that is disposed on an optical path of modulated light modulated by the modulation part of the spatial light modulator and that is configured to transmit a light component in an image region where a desired image is formed as projection light and shield a light component in an unnecessary region including a ghost image of the desired image of the modulated light modulated by the modulation part of the spatial light modulator, the method including allocating at least two modulation regions to the modulation part of the spatial light modulator, setting phase images of at least two images constituting a target image on a face to be projected in the at least two respective modulation regions, and controlling the light source in such a way that the modulation part in which the phase images of the at least two images are set is irradiated with the light.

(Supplementary Note 12)

In a program for controlling a projection device including a light source, a spatial light modulator that includes a modulation part that is irradiated with light emitted from the light source and that modulates a phase of the light with which the modulation part is irradiated, and a shield that is disposed on an optical path of modulated light modulated by the modulation part of the spatial light modulator and that is configured to transmit a light component in an image region where a desired image is formed as projection light and shield a light component in an unnecessary region including a ghost image of the desired image of the modulated light modulated by the modulation part of the spatial light modulator, the program causes a computer to execute the steps of allocating at least two modulation regions to the modulation part of the spatial light modulator, setting phase images of at least two images constituting a target image on a face to be projected in the at least two respective modulation regions, and controlling the light source in such a way that the modulation part in which the phase images of the at least two images are set is irradiated with the light.

This application claims priority based on Japanese Patent Application No. 2021-138618 filed on Aug. 27, 2021, the entire disclosure of which is incorporated herein.

REFERENCE SIGNS LIST

10, 20, 30, 40, 50, 60 projection device
11, 21, 31, 41, 51, 61 light source
13, 23, 33, 43, 53, 63 spatial light modulator
15, 25, 35, 45, 55, 65 shield
17, 27, 37, 47, 57, 67 control unit
46, 56 curved surface mirror
100, 200, 300, 400, 500, 600 projection unit
111, 211, 311, 411, 511 emitter
112, 212, 312, 412, 512 lens
15-1, 25-1, 45-1 first shield
15-2, 25-2, 45-2 second shield

What is claimed is:

1. A projection device comprising:

a light source;

a spatial light modulator that includes a modulation part that is irradiated with light emitted from the light source and that modulates a phase of the light with which the modulation part is irradiated;

a controller comprising:

a memory storing instructions; and a processor connected to the memory and configured to execute the instructions to:

allocate at least two modulation regions to the modulation part of the spatial light modulator;

set phase images of at least two images constituting a target image on a face to be projected in the at least two respective modulation regions; and control the light source in such a way that the modulation part in which the phase images of the at least two images are set is irradiated with the light;

a shield that is disposed on an optical path of modulated light modulated by the modulation part of the spatial light modulator and that is configured to transmit a light component in an image region where a desired image is formed as projection light and shield a light component in an unnecessary region including a ghost image of the desired image of the modulated light modulated in each of the at least two modulation regions set in the modulation part of the spatial light modulator; and a curved surface mirror that includes a curved reflecting surface irradiated with the modulated light modulated by the modulation part of the spatial light modulator, is disposed on an optical path of a light component of the image region forming the desired image, the light component having passed through the shield, of the modulated light modulated by the modulation part of the spatial light modulator, reflects the light component of the image region by the curved reflecting surface, and projects the projection light having a projection angle enlarged according to a curvature of the reflecting surface, wherein the processor of the controller is configured to execute the instructions to:

allocate a first modulation region and a second modulation region to the modulation part of the spatial light modulator; and set phase images of a first image and a second image constituting the target image in the first modulation region and the second modulation region, respectively, wherein the shield is disposed at a position at which a light component of the unnecessary region included in the modulated light modulated in each of the first modulation region and the second modulation region is shielded, and wherein the processor of the controller is configured to execute the instructions to:

set, in the first modulation region, a composite image obtained by combining a phase image of the first image constituting the target image and a virtual lens image condensing the modulated light forming the first image at a position of the reflecting surface of the curved surface mirror; and set, in the second modulation region, a composite image obtained by combining a phase image of the second image forming the target image and the virtual lens image condensing the modulated light forming the second image at a position of the reflecting surface of the curved surface mirror.

2. The projection device according to claim 1, wherein the shield is disposed at a position at which 0th-order light included in the modulated light modulated in the at least two modulation regions is shielded.

3. The projection device according to claim 1, wherein the processor of the controller is configured to execute the instructions to:

allocate the first modulation region to a left half of the modulation part of the spatial light modulator;

allocate the second modulation region to a right half of the modulation part of the spatial light modulator;

set a phase image of the first image corresponding to a left half of the target image in the first modulation region; and set a phase image of the second image corresponding to a right half of the target image in the second modulation region, and wherein the shield includes a first shield disposed at a position at which a light component of the unnecessary region included in the modulated light modulated in the first modulation region is shielded and a second shield disposed at a position at which a light component of the unnecessary region included in the modulated light modulated in the second modulation region is shielded.

4. The projection device according to claim 1, wherein the processor of the controller is configured to execute the instructions to:

allocate the first modulation region to an upper half of the modulation part of the spatial light modulator;

allocate the second modulation region to a lower half of the modulation part of the spatial light modulator;

set a phase image of the first image corresponding to a lower half of the target image in the first modulation region; and set a phase image of the second image corresponding to an upper half of the target image in the second modulation region, and wherein the shield includes a first shield disposed at a position at which a light component of the unnecessary region included in the modulated light modulated in the first modulation region is shielded and a second shield disposed at a position at which a light component of the unnecessary region included in the modulated light modulated in the second modulation region is shielded.

5. The projection device according to claim 1, wherein the processor of the controller is configured to execute the instructions to:

allocate the first modulation region to a left half of the modulation part of the spatial light modulator;

allocate the second modulation region to a right half of the modulation part of the spatial light modulator;

set a phase image of the first image corresponding to a right half of the target image in the first modulation region; and set a phase image of the second image corresponding to a left half of the target image in the second modulation region, and wherein the shield is disposed at a position at which a light component of the unnecessary region included in the modulated light modulated in the first modulation region and a light component of the unnecessary region included in the modulated light modulated in the second modulation region are shielded.

6. The projection device according to claim 1, wherein the processor of the controller is configured to execute the instructions to:

allocate the first modulation region to an upper half of the modulation part of the spatial light modulator;

allocate the second modulation region to a lower half of the modulation part of the spatial light modulator;

set a phase image of the first image corresponding to an upper half of the target image in the first modulation region; and set a phase image of the second image corresponding to a lower half of the target image in the second modulation region, and wherein the shield is disposed at a position at which a light component of the unnecessary region included in the modulated light modulated in the first modulation region and a light component of the unnecessary region included in the modulated light modulated in the second modulation region are shielded.

7. The projection device according to claim 1, further comprising at least two light sources, wherein, in each of the at least two light sources, an emission angle of light emitted from each of the at least two light sources is set in such a way that regions to be trimmed included in the target image overlap with each other.

8. A projection control method of controlling a projection device including a light source, a spatial light modulator that includes a modulation part that is irradiated with light emitted from the light source and that modulates a phase of the light with which the modulation part is irradiated, and a shield that is disposed on an optical path of modulated light modulated by the modulation part of the spatial light modulator and that is configured to transmit a light component in an image region where a desired image is formed as projection light and shield a light component in an unnecessary region including a ghost image of the desired image of the modulated light modulated by the modulation part of the spatial light modulator, the projection control method comprising:

allocating at least two modulation regions to the modulation part of the spatial light modulator;

setting phase images of at least two images constituting a target image on a face to be projected in the at least two respective modulation regions; and controlling the light source in such a way that the modulation part in which the phase images of the at least two images are set is irradiated with the light, wherein the projection device further includes a curved surface mirror that includes a curved reflecting surface irradiated with the modulated light modulated by the modulation part of the spatial light modulator, is disposed on an optical path of a light component of the image region forming the desired image, the light component having passed through the shield, of the modulated light modulated by the modulation part of the spatial light modulator, reflects the light component of the image region by the reflecting surface, and projects the projection light having a projection angle enlarged according to a curvature of the reflecting surface, wherein the projection control method further comprises:

allocating a first modulation region and a second modulation region to the modulation part of the spatial light modulator; and setting phase images of a first image and a second image constituting the target image in the first modulation region and the second modulation region, respectively, wherein the shield is disposed at a position at which a light component of the unnecessary region included in the modulated light modulated in each of the first modulation region and the second modulation region is shielded, and wherein the projection control method further comprises:

setting, in the first modulation region, a composite image obtained by combining a phase image of the first image constituting the target image and a virtual lens image condensing the modulated light forming the first image at a position of the reflecting surface of the curved surface mirror; and setting, in the second modulation region, a composite image obtained by combining a phase image of the second image forming the target image and the virtual lens image condensing the modulated light forming the second image at a position of the reflecting surface of the curved surface mirror.

9. A non-transitory recording medium storing a program for controlling a projection device including a light source, a spatial light modulator that includes a modulation part that is irradiated with light emitted from the light source and that modulates a phase of the light with which the modulation part is irradiated, and a shield that is disposed on an optical path of modulated light modulated by the modulation part of the spatial light modulator and that is configured to transmit a light component in an image region where a desired image is formed as projection light and shield a light component in an unnecessary region including a ghost image of the desired image of the modulated light modulated by the modulation part of the spatial light modulator, the program causing a computer to execute operations comprising:

allocating at least two modulation regions to the modulation part of the spatial light modulator;

setting phase images of at least two images constituting a target image on a face to be projected in the at least two respective modulation regions; and controlling the light source in such a way that the modulation part in which the phase images of the at least two images are set is irradiated with the light, wherein the projection device further includes a curved surface mirror that includes a curved reflecting surface irradiated with the modulated light modulated by the modulation part of the spatial light modulator, is disposed on an optical path of a light component of the image region forming the desired image, the light component having passed through the shield, of the modulated light modulated by the modulation part of the spatial light modulator, reflects the light component of the image region by the reflecting surface, and projects the projection light having a projection angle enlarged according to a curvature of the reflecting surface, wherein the program further causes the computer to execute operations comprising:

allocating a first modulation region and a second modulation region to the modulation part of the spatial light modulator; and setting phase images of a first image and a second image constituting the target image in the first modulation region and the second modulation region, respectively, wherein the shield is disposed at a position at which a light component of the unnecessary region included in the modulated light modulated in each of the first modulation region and the second modulation region is shielded, and wherein the program further causes the computer to execute operations comprising:

setting, in the first modulation region, a composite image obtained by combining a phase image of the first image constituting the target image and a virtual lens image condensing the modulated light forming the first image at a position of the reflecting surface of the curved surface mirror; and setting, in the second modulation region, a composite image obtained by combining a phase image of the second image forming the target image and the virtual lens image condensing the modulated light forming the second image at a position of the reflecting surface of the curved surface mirror.

* * * * *